US010747446B2

(12) United States Patent
Isoda et al.

(10) Patent No.: US 10,747,446 B2
(45) Date of Patent: Aug. 18, 2020

(54) COMPUTER SYSTEM AND STORAGE DEVICE ACTIVATION CONTROL METHOD

(71) Applicants: Hitachi, Ltd., Tokyo (JP); The University of Tokyo, Tokyo (JP)

(72) Inventors: Yuya Isoda, Tokyo (JP); Kazuhiko Mogi, Tokyo (JP); Makoto Ootahara, Tokyo (JP); Kazuo Goda, Tokyo (JP); Yuto Hayamizu, Tokyo (JP); Masaru Kitsuregawa, Tokyo (JP)

(73) Assignees: HITACHI, LTD., Tokyo (JP); THE UNIVERSITY OF TOKYO, Tokyo (JP)

( * ) Notice: Subject to any disclaimer, the term of this patent is extended or adjusted under 35 U.S.C. 154(b) by 226 days.

(21) Appl. No.: 15/805,362

(22) Filed: Nov. 7, 2017

(65) Prior Publication Data
US 2018/0150241 A1    May 31, 2018

(30) Foreign Application Priority Data
Nov. 25, 2016    (JP) .................................. 2016-228561

(51) Int. Cl.
*G06F 3/06* (2006.01)
*G06F 9/50* (2006.01)
*G06F 9/455* (2018.01)

(52) U.S. Cl.
CPC .......... *G06F 3/0613* (2013.01); *G06F 3/0608* (2013.01); *G06F 3/0611* (2013.01); *G06F 3/0625* (2013.01); *G06F 3/0632* (2013.01); *G06F 3/0689* (2013.01); *G06F 9/5016* (2013.01); *G06F 2009/45579* (2013.01)

(58) Field of Classification Search
CPC ..... G06F 3/0613; G06F 3/0611; G06F 3/0625
See application file for complete search history.

(56) References Cited

U.S. PATENT DOCUMENTS 5,900,007 A * 5/1999 Nunnelley .............. G06F 1/206
                                                                711/4
6,574,676 B1 * 6/2003 Megiddo ............... G06F 3/0601
                                                                710/5

(Continued)

FOREIGN PATENT DOCUMENTS

| JP | 2009-080603 A | 4/2009 |
| JP | 2010-003149 A | 1/2010 |
| JP | 4642347 B2    | 3/2011 |

*Primary Examiner* — Hosain T Alam
*Assistant Examiner* — Anthony G Gemignani
(74) *Attorney, Agent, or Firm* — Mattingly & Malur, PC

(57) ABSTRACT

Since storage devices are activated in the issuance order of I/O commands, the time required for processing of a plurality of I/O commands based on one or more I/O requests may become long. When issuance destinations of two or more I/O commands are two or more storage devices in a non-activated state from among a plurality of storage devices, a computer system determines an activation order of the two or more storage devices on the basis of two or more I/O quantities which respectively correspond to the two or more storage devices. Each of the I/O quantities of the two or more storage devices is an I/O quantity in accordance with one or more I/O commands for the relevant storage device from among the two or more I/O commands. The computer system activates the two or more storage devices in the determined activation order.

14 Claims, 17 Drawing Sheets

(56) References Cited

U.S. PATENT DOCUMENTS

| | | | |
|---|---|---|---|
| 8,473,646 B1* | 6/2013 | Certain | G06F 13/1626 |
| | | | 710/39 |
| 9,239,786 B2* | 1/2016 | Ki | G06F 12/0684 |
| 2004/0215779 A1* | 10/2004 | Weber | G06F 1/26 |
| | | | 709/226 |
| 2006/0007578 A1 | 1/2006 | Suzuki et al. | |
| 2009/0063883 A1* | 3/2009 | Mori | G06F 3/0608 |
| | | | 713/324 |
| 2009/0083558 A1 | 3/2009 | Sugiki et al. | |
| 2009/0217065 A1* | 8/2009 | Araujo, Jr. | G06F 1/3203 |
| | | | 713/320 |
| 2009/0319811 A1 | 12/2009 | Kawakami | |
| 2010/0100645 A1* | 4/2010 | Yamaguchi | G06F 3/0611 |
| | | | 710/6 |
| 2012/0011312 A1* | 1/2012 | Dorfman | G06F 1/3221 |
| | | | 711/113 |
| 2012/0284431 A1* | 11/2012 | Otani | H04L 67/1097 |
| | | | 710/6 |
| 2016/0320987 A1* | 11/2016 | Boden | G06F 3/0625 |

* cited by examiner

FIG. 3

```
Query 1

1   select
2     o_orderpriority,
3     count(*) as count_num
4   from
5     part, lineitem, orders
6   where
7     p_partkey = l_partkey and l_orderkey = o_orderkey
8     and o_orderdate between date '1995-01-01' and date '1996-12-31'
9     and p_type = 'SMALL PLATED COPPER'
10    and p_size >= 1
11    and p_size <= 8
12  group by o_orderpriority
13  order by o_orderpriority ;
```
3000

FIG. 4

```
Query Execution Plan: Query 1

<<Tree View>>
1  QUERY : 1
2    SELECT STATEMENT
3    |-CREATE LOCAL WORK TABLE(WORK TABLE 1)
4    | |-HASH JOIN
5    | | |-HASH JOIN
6    | | | |-KEY SCAN(ADBUSER01.PART)
7    | | | +-TABLE SCAN(ADBUSER01.LINEITEM)
8    | | +-TABLE SCAN(ADBUSER01.ORDERS)
9    | +-SORTING BYTE
10   |-WORK TABLE SCAN(WORK TABLE 1)
11   +-LOCAL HASH GROUPING -SPECIFIC
```
4000

FIG. 5

I/O control plan: Query 1

1-1 Random Read I/O (ADBUSER01.Index.PART)
1-1 Random Read I/O (ADBUSER02.Table.PART)
1-2 Sequential Read I/O (ADBUSER04.Table.LINEITEM)
1-3 Sequential Read I/O (ADBUSER06.Table.ORDERS)

Device control plan: Query 1

1-1 HDD1 (Random Read I/O)
1-1 HDD2 (Random Read I/O)
1-2 HDD3 (Sequential Read I/O)
1-3 HDD4 (Sequential Read I/O)

Data storage table
7000

| DB element name | Device ID |
| --- | --- |
| ADBUSER01.Index.PART | HDD1 |
| ADBUSER02.Table.PART | HDD2 |
| ADBUSER04.Table.LINEITEM | HDD3 |
| ADBUSER06.Table.ORDERS. | HDD4 |

FIG. 8

I/O management table
8000

| Item | Content |
| --- | --- |
| Device | HDD1 |
| Starting address | 02BADC56 |
| Size | 4KB |

FIG. 9

Device I/O management table
9000

| Item | Content |
|---|---|
| Device ID | HDD1 |
| State | Standby |
| I/O number | 20 |
| Size | 80 KB |
| Elapsed time length | 92 msec |

Device I/O management table
9000

| Item | Content |
|---|---|
| Device ID | HDD2 |
| State | Standby |
| I/O number | 3 |
| Size | 12 KB |
| Elapsed time length | 130 msec |

FIG. 10

System management table
120

| Item | Content |
|---|---|
| Device ID | ST001 |
| Type | Storage |
| State | Active |
| Power limit | 300 W |
| Current Power | 250 W |
| Deadline time length | 60 sec |
| Device Control Designation | I/O Number |

FIG. 11

Device power management table 121

| Item | Content |
|---|---|
| Device ID | HDD1 |
| Type | Physical |
| State | Standby |
| Stop time | 2016/01/01 00:11:22 |
| Activation time | 2015/12/30 00:13:42 |
| Stop time length | 10 sec |
| Activation time length | 4 sec |
| Stopping power | 25 W |
| Activation power | 200 W |
| Standby time length | 30 sec |
| Peak power | 30 W |
| Active power | 10 W |
| Idle power | 6 W |
| Standby power | 2 W |

Device power management table 121

| Item | Content |
|---|---|
| Device ID | HDD2 |
| Type | Physical |
| State | Standby |
| Stop time | 2016/01/01 00:15:22 |
| Activation time | 2015/12/30 00:11:42 |
| Stop time length | 11 sec |
| Activation time length | 5 sec |
| Stopping power | 25 W |
| Activation power | 201 W |
| Standby time length | 32 sec |
| Peak power | 29 W |
| Active power | 10 W |
| Idle power | 6 W |
| Standby power | 2 W |

FIG. 22

Data storage table
225

| DB element name | Device ID |
|---|---|
| ADBUSER01.Index.PART | LD001 |
| ADBUSER02.Table.PART | LD001 |
| ADBUSER04.Table.LINEITEM | LD002 |
| ADBUSER06.Table.ORDERS. | LD003 |

FIG. 23

Device ID conversion table
226

| Device ID | Device ID |
|---|---|
| LD001 | HDD1 |
| LD001 | HDD2 |
| LD002 | HDD3 |
| LD003 | HDD4 |

COMPUTER SYSTEM AND STORAGE DEVICE ACTIVATION CONTROL METHOD

CROSS-REFERENCE TO PRIOR APPLICATION

This application relates to and claims the benefit of priority from Japanese Patent Application number 2016-228561, filed on Nov. 25, 2016 the entire disclosure of which is incorporated herein by reference.

BACKGROUND

The present invention generally relates to activation control of storage devices.

In recent years, an amount of data handled in the distribution industry and the financial industry has been being increasing daily. As the amount of data increases, the scale of a storage device group (one or more storage devices) is being enlarged and the power consumption by storage device groups is increasing. Therefore, there is a demand for a technique that implements, for example, accumulation and analysis of big data with low power consumption.

There is a spin-down technique for hard disk drives (hereinafter referred to as the HDDs) as an example of low power consumption techniques for the storage device groups. The spin-down technique is a technique that reduces the power consumption by reducing the speed of, or stopping, the revolutions of the disks. However, if the HDDs in a spin-down state is spun up, the power consumption of the HDDs temporarily increases considerably. If the HDDs in excess of a certain quantity are spun up simultaneously under this circumstance, there is a possibility that the power consumption may exceed its upper limit.

There are techniques disclosed in, for example, JP4642347 and JP2010-003149 with respect to this problem. JP4642347 discloses a technique that shifts an activation order of HDDs. JP2010-003149 discloses a technique that calculates the power consumption when activating HDDs of a certain RAID (Redundant Array of Independent [or Inexpensive] Disks) group and shifting the activation order of the HDDs as necessary.

Furthermore, since it takes time to spin up HDDs from its start to its completion, I/O (Input/Output) to the HDDs in a low power-consumed state requires some time. There is a technique disclosed in JP2009-080603 with respect to this problem. JP2009-080603 discloses a technique that activates the HDDs in the low power-consumed state in advance on the basis of I/O history for the HDDs.

SUMMARY

However, regarding these techniques, time required for processing of a plurality of I/O commands based on one or more I/O requests (for example, big data analysis) can become long. This is because the HDDs are activated (spin-up) in the issuance order of the I/O commands regardless of the status of the I/O commands. For example, let us assume that there are HDD1 which is an issuance destination of I/O command 1 and HDD2 which is an issuance destination of I/O commands 2 to 9 and the number of HDDs which can be activated simultaneously is one. When the I/O command 1 is issued first, the activation of HDD1 is started first. After an activation time length (time from the start of the activation until its termination) for HDD1 has elapsed, response 1 for the I/O command 1 is returned. Subsequently, after the activation time length for HDD2 has elapsed, responses 2 to 9 for the I/O commands 2 to 9 are returned. During the activation time length for HDD2, a response which exists as a processing target is only the response 1.

Storage devices other than HDDs, for example, SSDs (Solid State Drives) can also have the above-described problems.

Furthermore, the above-described problems can also exist in a case where a limitation on the number of storage devices which can be activated simultaneously is a limitation other than an upper limit of the power consumption, for example, a case where the number of storage device readers (such as magnetic tape readers) is less than the number of storage devices (such as magnetic tapes). Incidentally, in this case, the activation of a storage device means to set the storage device to a storage device reader for the sake of I/O to the relevant storage devices.

When issuance destinations of two or more I/O commands from among a plurality of I/O commands are two or more storage devices in a non-activated state from among a plurality of storage devices, a computer system determines an activation order of the two or more storage devices on the basis of two or more I/O quantities which respectively correspond to the two or more storage devices. Each of the I/O quantities of the two or more storage devices is an I/O quantity in accordance with one or more I/O commands for the relevant storage device from among the two or more I/O commands. The computer system activates the two or more storage devices in the determined activation order.

The time required for processing of a plurality of I/O commands based on one or more I/O requests can be expected to be reduced.

BRIEF DESCRIPTION OF DRAWINGS

FIG. 3 illustrates an example of a query;

FIG. 4 illustrates an example of a query execution plan;

FIG. 5 illustrates an example of an I/O control plan;

FIG. 6 illustrates an example of a device control plan;

FIG. 7 illustrates an example of a data storage table;

FIG. 8 illustrates an example of an I/O management table;

FIG. 9 illustrates an example of a device I/O management table;

FIG. 10 illustrates an example of a system management table;

FIG. 11 illustrates an example of a device power management table;

FIG. 22 illustrates an example of a data storage table according to Embodiment 5;

FIG. 23 illustrates an example of a device ID conversion table; and

DESCRIPTION OF EMBODIMENTS

Figure 1:
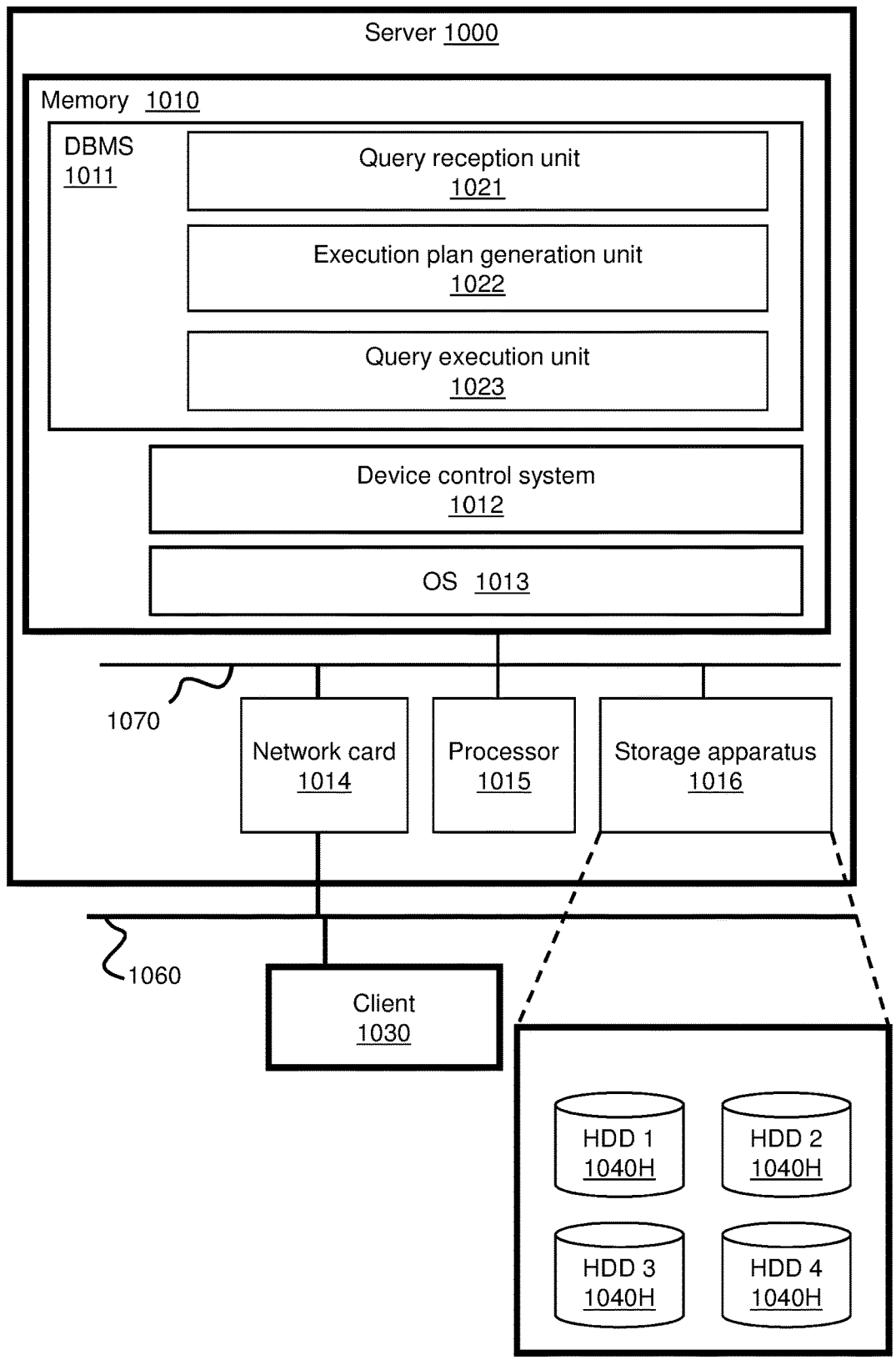
FIG. 1 illustrates the configuration of a data management system according to Embodiment 1.

Some embodiments will be explained with reference to the drawings.

In the following description, an "interface unit" includes one or more interfaces. One or more interfaces may be one or more interface devices of the same type (for example, one or more NICs [Network Interface Card(s)]) or two or more interface devices of different types (for example, an NIC(s) and an HBA(s) [Host Bus Adapter(s)]).

Furthermore, in the following description, a "memory unit" includes one or more memories. At least one memory may be a volatile memory or a nonvolatile memory. Furthermore, in the following description, a "processor unit" includes one or more processors. At least one processor is typically a CPU (Central Processing Unit). The processor may include a hardware circuit that executes a part or whole of processing Furthermore, in the following description, a "storage device(s)" means a physical storage device(s) and may typically be a nonvolatile storage device(s) (such as an auxiliary storage device(s)).

Furthermore, in the following description, "RAID" stands for Redundant Array of Independent (or Inexpensive) Disks. A RAID group is composed of a plurality of storage devices (or a plurality of storage areas based on a plurality of storage devices) and data are stored according to a RAID level associated with the relevant RAID group.

Furthermore, in the following description, processing will be sometimes explained by referring to a "program" as a subject; however, the program is executed by the processor unit to perform specified processing by using at least one of the memory unit and the interface unit as necessary and, therefore, the subject of the processing may be the processor unit. The program may be installed from a program source to a computer. The program source may be, for example, a program distribution server or a computer-readable storage medium. Furthermore, in the following description, two or more programs may be implemented as one program or one program may be implemented as two or more programs.

Furthermore, in the following description, information will be sometimes explained by using the expression "xxx table"; however, the information may be expressed in any data structure. Specifically speaking, "xxx table" can be referred to as "xxx information" in order to indicate that the information does not depend on the data structure. Furthermore, in the following description, the structure of each table is an example. Regarding at least one table, not all information items (such as rows or columns) have to be always indispensable and further information items may exist or at least one information item may not exist. Furthermore, one table may be divided into two or more tables or all or part of the two or more tables may be one table.

Furthermore, in the following description, when an explanation is given without distinguishing elements of the same type, a reference numeral (or a common part of the reference numeral) may be used; and when an explanation is given by distinguishing the elements of the same type, an ID of the relevant element (the reference numeral of the element) may be used. For example, when HDDs are explained without particularly distinguishing them from each other, the HDDs may be described as "HDD 1040H"; and when the HDDs are explained by distinguishing the individual HDDs from each other, they may be described as, for example, "HDD1" and "HDD2."

Furthermore, in the following description, a "computer system" may be at least one of a server system and a storage system. The "server system" may be one or more physical servers (such as server clusters) or may include at least one virtual server (such as VM (Virtual Machine)). Furthermore, the "storage system" may be one or more physical storage apparatuses or may include at least one virtual storage apparatus (such as SDS (Software Defined Storage)).

Embodiment 1

FIG. 1 illustrates the configuration of a data management system according to Embodiment 1.

A server 1000 is an example of a computer system. The server 1000 may be, for example, a personal computer, a workstation, or a mainframe or may be a virtual computer configured by a virtual program in these computers. The server 1000 includes a network card 1014, a memory 1010, a storage apparatus 1016, and a processor 1015 coupled to them. The network card 1014, the memory 1010, and the storage apparatus 1016 are coupled to the processor 1015 via, for example, an internal network (such as a bus) 1070. The server 1000 may include an input device (not illustrated in the drawing) such as a keyboard and a pointing device and an output device (not illustrated in the drawing) such as a liquid crystal display. The input device and the output device may be coupled to the processor 1015. The input device and the output device may be integrated with each other.

The processor 1015 is an example of the processor unit. The processor 1015 is, for example, a microprocessor and executes computer programs. The computer programs executed by the processor 1015 are, for example, an OS (Operating System) 1013, a DBMS (Database management system) 1011, and a device control system 1012.

The memory 1010 is an example of the memory unit. The memory 1010 is, for example, a volatile DRAM (Dynamic Random Access Memory) or the like and temporarily stores programs executed by the processor 1015 and information (data) used by the programs. The programs are the OS 1013, the DBMS 1011, and the device control system 1012 mentioned above.

The storage apparatus 1016 is a plurality of storage devices 1040. The storage apparatus 1016 is, for example, a plurality of HDDs (Hard Disk Drives) 1040H. The storage apparatus 1016 may be one or more RAID groups. The storage apparatus 1016 stores a database. The database includes, for example, one or more DB tables (the tables in the database will be referred to as the "DB table" in order to avoid confusion in the description) and one or more indexes. Part of the database may be stored in the memory 1010.

The network card 1014 is an example of the interface unit. The network card 1014 is coupled to a client 1030 via an external network (such as an IP [Internet Protocol] network or an FC [Fibre Channel] network) 1060.

The client 1030 is, for example, a computer. The client 1030 is an example of an issuance source of a query for the DBMS 1011. The query issuance source is not limited to the client 1030. For example, the query issuance source may be, instead of or in addition to the client 1030, an application program (not shown in the drawing) executed by the processor 1015.

The server 1000 may include a plurality of elements which are any one of the processor 1015, the memory 1010, the storage apparatus 1016, and the network card 1014 in order to enhance performance and redundancy.

With the server 1000, the DBMS 1011 executes a query issued from the client 1030 and issues I/O commands for the storage apparatus 1016, which stores the database, to the OS 1013 in order to read data from the database or write data to the database upon the execution of the query. The OS 1013 accepts the I/O commands and issues the I/O commands to the storage apparatus 1016. Each HDD 1040H in the storage apparatus 1016 accepts an I/O command, reads or writes data in accordance with the I/O command, and returns a response including the result. The DBMS 1011 includes a query reception unit 1021, an execution plan generation unit 1022, and a query execution unit 1023.

The query reception unit 1021 accepts a query issued by the client 1030. The query is an example of an I/O request. The query is described in, for example, a Structured Query Language (SQL).

The execution plan generation unit 1022 generates a query execution plan including one or more database operations, which are necessary to execute the query, from the query accepted by the query reception unit 1021. The query execution plan is information including, for example, the relationship between one or more database operations and the execution order of the database operations and is stored in the memory 1010. The query execution plan is sometimes represented by a tree structure by indicating the database operations as nodes and the relationship between the database operations and the execution order as edges.

The query execution unit 1023 executes the query accepted by the query reception unit 1021 in accordance with the query execution plan generated by the execution plan generation unit 1022 and returns the execution result to the client 1030. In doing so, the query execution unit 1023 is designed to execute the database operations in the query execution plan in a specified order and return the execution result of the query to the client 1030 which is a query issuance source.

The query execution unit 1023 can execute a plurality of tasks, which are generated based on one or more queries, in parallel. When executing at least one task, the query execution unit 1023 issues a plurality of I/O commands to the storage apparatus 1016 to write or read data to or from the database.

The query execution unit 1023 may process the plurality of queries in parallel.

Furthermore, the DBMS 1011 may be a DBMS to which a technique disclosed in JP4611830 is applied. Specifically speaking, for example, with respect to one query, the query execution unit 1023 may: (a) generate a task to execute a database operation; (b) issue a command to read necessary data for the database operation corresponding to the task by executing the generated task; (c) newly generate one or more tasks, each of which executes another database operation, when it becomes necessary to execute the other database operation on the basis of the execution result of the database operation corresponding to the task executed in (b); and (d) perform (b) and (c) with respect to each of the newly generated one or more tasks. In this case, the query execution unit 1023 may execute the thus generated one or more tasks in parallel. When two or more executable tasks exist, the query execution unit 1023 may execute at least two tasks in parallel from among those two or more tasks. Incidentally, in the above-described case, the query execution unit 1023 may execute a plurality of database operations by one task. Furthermore, the query execution unit 1023 may execute the next database operation by the same task without generating a new task every time. Regarding implement of tasks, for example, processes and kernel threads or the like implemented by the OS 1013 as well as user threads implemented by libraries or the like may be used.

The device control system 1012 determines the activation order of two or more HDDs 1040H and activates the two or more HDDs 1040H in the determined activation order. Specifically speaking, for example, the device control system 1012 generates an I/O control plan based on a query execution plan generated by the DBMS 1011 and generates a device control plan based on the I/O control plan. Then, the device control system 1012 performs power supply control of the HDDs 1040H on the basis of the device control plan.

Figure 2:
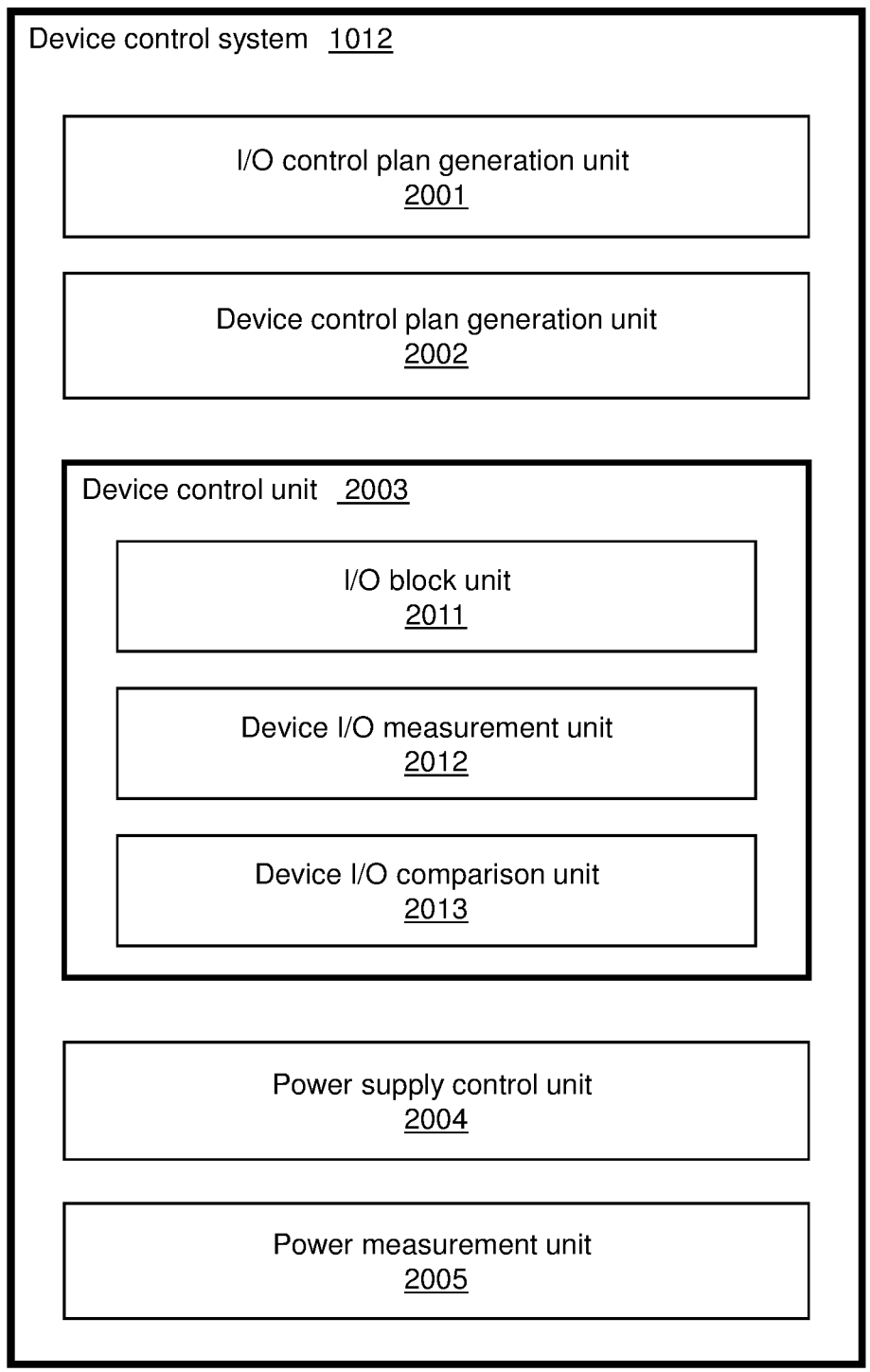
FIG. 2 illustrates the configuration of a device control system.

FIG. 2 illustrates the configuration of the device control system 1012.

The device control system 1012 includes an I/O control plan generation unit 2001, a device control plan generation unit 2002, a device control unit 2003, a power supply control unit 2004, and a power measurement unit 2005.

The I/O control plan generation unit 2001 generates an I/O control plan based on the query execution plan generated by the DBMS 1011. The I/O control plan 5000 is information representing the relationship between I/O target data (such as an index or a DB table) and I/O priority levels. It is desirable that I/O to the I/O target data of a higher I/O priority level should be performed earlier.

The device control plan generation unit 2002 generates a device control plan based on the I/O control plan generated by the I/O control plan generation unit 2001. The device control plan is information representing the one or more HDDs 1040H, which are the issuance destinations of a plurality of I/O commands, and one or more I/O priority levels which respectively correspond to the one or more HDDs 1040H.

The device control unit 2003 activates the HDDs 1040H via the power supply control unit 2004 on the basis of the device control plan 6000 generated by the device control plan generation unit 2002. The device control unit 2003 includes an I/O block unit 2011, a device I/O measurement unit 2012, and a device I/O comparison unit 2013. The I/O block unit 2011, the device I/O measurement unit 2012, and the device I/O comparison unit 2013 are respectively independently operable.

The I/O block unit 2011 controls I/O to the HDDs 1040H represented by the device control plan. The I/O block unit 2011 suppresses (or blocks) the issuance of an I/O command(s) to an HDD(s) 1040H, which has not been activated yet, and issues an I/O command(s) to an activation target HDD(s) 1040H or an HDD(s) 1040H in the activated state. The "HDD which has not been activated yet" means an HDD which is in a standby state (low power-consumed state) and which will become an activation target at some future time, but for which its turn to be activated has not come yet. The "standby state" is an example of the non-activated state and means a state where the power consumption is less than a specified value (specifically speaking, for example, a state where the revolutions of the disks are slow or are stopped). The "activation target HDD" means an HDD which is in the standby state and for which its turn to be activated has come. The "HDD in the activated state" means an HDD after the completion of activation, for example, either in an active state or an idle state as described later.

The device I/O measurement unit 2012 measures an I/O quantity and elapsed time length with respect to each HDD 1040H regarding which the issuance of I/O commands is suppressed. The HDD(s) 1040H regarding which the issuance of I/O commands is suppressed will be hereinafter referred to as the "waiting HDD(s)" and the I/O command(s) which is suppressed from being issued will be hereinafter referred to as the "suppressed I/O command(s)." The "I/O quantity" of the HDD 1040H is the quantity of I/O in accordance with one or more I/O commands for the HDD 1040H (specifically speaking, all the suppressed I/O commands for the HDD 1040H). In this embodiment, at least one of the "I/O number" and the "I/O size" can be adopted as the "I/O quantity." The "I/O number" of the HDD 1040H is the number of suppressed I/O commands for the HDD 1040H. The "I/O size" of the HDD 1040H is a total size of I/O target data in accordance with the suppressed I/O commands for the HDD 1040H. The "elapsed time length" of the HDD 1040H is an amount of time elapsed since an I/O command for the HDD 1040H was suppressed (or blocked) for the first time (that is, the amount of time elapsed since the first I/O command from among the suppressed I/O commands was suppressed).

The device I/O comparison unit 2013 compares the I/O quantities (at least one of the I/O number and the I/O size) of two or more HDD 1040H, determines the activation order of the two or more HDDs 1040H on the basis of the comparison result, and issues activation instructions of the two or more HDDs 1040H to the power supply control unit 2004 in the determined activation order.

The power supply control unit 2004 is an example of an activation control unit. The power supply control unit 2004 performs power supply control including the activation control of the HDDs 1040H on the basis of at least one of an instruction from the device control unit 2003 and the device control plan generated by the device control plan generation unit 2002. Regarding the power supply control, reference is made to the result of the power measurement by the power measurement unit 2005.

The power measurement unit 2005 measures the electric power of the server 1000 and the storage apparatus 1016.

The query reception unit 1021, the execution plan generation unit 1022, the query execution unit 1023, the I/O control plan generation unit 2001, the device control plan generation unit 2002, the device control unit 2003 (the I/O block unit 2011, the device I/O measurement unit 2012, the device I/O comparison unit 2013), the power supply control unit 2004, and the power measurement unit 2005 described above are implemented by execution of computer programs by the processor 1015; however, at least part of processing executed by at least one of these components may be implemented by hardware.

Furthermore, the configuration of the DBMS 1011 illustrated in FIG. 1 and the configuration of the device control system 1012 illustrated in FIG. 2 are just examples. For example, a certain component may be divided into a plurality of components or a plurality of components may be integrated into one component.

The device control system 1012 will be explained below in more detail.

FIG. 3 illustrates an example of a query. FIG. 4 illustrates an example of a query execution plan. FIG. 5 illustrates an example of an I/O control plan.

When the query reception unit 1021 accepts a query 3000 illustrated in FIG. 3, the execution plan generation unit 1022 generates a query execution plan 4000 illustrated in FIG. 4. The I/O control plan generation unit 2001 generates an I/O control plan 5000 illustrated in FIG. 5 on the basis of the query execution plan 4000 illustrated in FIG. 4. The I/O control plan 5000 is determined in accordance with the I/O order of an index and a DB table which are specified by the query execution plan 4000. According to the query execution plan 4000 illustrated by the example in FIG. 4, I/O is performed to the index and the DB table in order starting from the deepest hierarchy. Regarding the query execution plan 4000, the sixth and seventh rows are the deepest, so that I/O is performed to them first. However, since "HASH JOIN" is written on the fifth row, I/O is performed to the sixth row at the very beginning, which corresponds to build processing that is executed first for the HASH JOIN processing. Next, the seventh row which corresponds to probe processing is executed. According to such query execution plan 4000, the I/O control plan generation unit 2001 generates the I/O control plan 5000 illustrated by the example in FIG. 5. The I/O control plan 5000 represents the relationship between an I/O type (such as "Random Read I/O"), I/O target data (for example, a DB element name like "ADBUSER01.Index.PART"), and an I/O priority level (such as "1-1"). Since there is a possibility that a plurality of valleys may exist in the query execution plan 4000, it is desirable that the existence of the valleys may be considered with respect to the I/O control plan 5000 by setting, for example, "1-1," "1-1," "1-2," and "1-3" as the I/O priority levels. A smaller number indicates a higher I/O priority level.

Incidentally, the query execution plan 4000 and the I/O control plan 5000 may be stored in the memory 1010.

FIG. 6 illustrates an example of a device control plan. FIG. 7 illustrates an example of a data storage table.

The device control plan generation unit 2002 generates a device control plan 6000 illustrated in FIG. 6 on the basis of the I/O control plan 5000 illustrated in FIG. 5. The I/O control plan 5000 represents an index and DB table of I/O targets. Furthermore, a data storage table 7000 illustrated in FIG. 7 represents, with respect to each DB element (an index or a DB table), a "DB element name" (the name of a DB element) and a "device ID" (the ID of an HDD 1040H which stores the DB element). The device control plan generation unit 2002 identifies, with respect to each DB element represented by the I/O control plan 5000, an HDD 1040H which stores the DB element from the data storage table 7000, and generates the device control plan 6000 including the I/O priority level of the DB element and the ID of the HDD 1040H which stores the DB element. The device control plan 6000 is information representing one or more HDDs 1040H, which are issuance destinations of a plurality of I/O commands, and one or more I/O priority levels c respectively orresponding to the one or more HDDs 1040H. The device control plan generation unit 2002 transmits the device control plan 6000 to the device control unit 2003 and the power supply control unit 2004.

Incidentally, the device control plan 6000 and the data storage table 7000 are stored in, for example, the memory 1010.

Furthermore, the device control plan 6000 is a low device level plan (information). Control target HDDs in the activation order can be identified from such plan and the HDDs 1040H can be activated in the order different from the I/O order on the basis of the I/O quantity comparison result of the identified HDDs 1040H.

Then, such device control plan 6000 (and the aforementioned I/O control plan 5000) (or information based on such plan 6000 (and 5000)) may be output to, and displayed on, a computer (not shown in the drawing) used by an administrator for the purpose of, for example, performance analysis. In other words, the device control plan 6000 can serve as information to control the activation of the HDDs 1040H and information used for, for example, the performance analysis.

FIG. 8 illustrates an example of an I/O management table. FIG. 9 illustrates an example of a device I/O management table.

An I/O management table 8000 is prepared for each I/O command generated by the query execution unit 1023. The I/O management table 8000 may be created by the query execution unit 1023, the OS 1013, or the I/O block unit 2011. The I/O management table 8000 represents, with respect to each I/O command, an ID of an issuance destination HDD of the relevant I/O command, a starting address designated by the I/O command, and the size of data to which I/O is performed in accordance with the I/O command.

The I/O block unit 2011 generates a device I/O management table 9000 based on the I/O management table 8000 corresponding to a suppressed I/O command. According to an example of FIG. 9, the device I/O management table 9000 is generated with respect to each activation unit. The "activation unit" is a unit to which the activation turn is assigned, and is an HDD 1040H in this embodiment (the activation unit may be other units like a RAID group unit instead of an HDD).

The device I/O management table 9000 represents a "device ID" (an ID of the corresponded HDD 1040H), a "state" (a state of the HDD 1040H), "I/O number" (the number of suppressed I/O commands whose issuance destination is the HDD 1040H), "I/O size" (the total "size" corresponding to all the suppressed I/O commands for the HDD 1040H), and "elapsed time length" (an amount of time elapsed since an I/O command for the HDD 1040H was suppressed (or blocked) for the first time (that is, the amount of time elapsed since the first I/O command, from among the suppressed I/O commands, was suppressed)). The "I/O number," the "I/O size," and the "elapsed time length" are values measured by the device I/O measurement unit 2012.

The device I/O comparison unit 2013 refers to the device I/O management table 9000 of the HDD 1040H corresponding to the device ID described in the device control plan 6000 and compares the I/O number (or the I/O size) of the two or more HDDs 1040H. When the I/O quantity which is the comparison target is the I/O number, the device I/O comparison unit 2013 outputs a device I/O management table with the largest I/O number from among device I/O management tables 9000 which have not been output yet. When the I/O quantity which is the comparison target is the I/O size, the device I/O comparison unit 2013 outputs a device I/O management table with the largest I/O size from among device I/O management tables 9000 which have not been output yet. The device I/O comparison unit 2013 notifies the power supply control unit 2004 of the activation of an HDD 1040H corresponding to the device ID described in the device I/O management table which has been output. Such output and notification are repeated until there is no longer any device I/O management table 9000 which has not been output. As a result, the activation order is determined and the activation order is reported to the power supply control unit 2004. Incidentally, instead of the above, the device I/O comparison unit 2013 may compare the I/O quantities of the two or more HDDs 1040H (the HDDs 1040H in the standby state) which fall under at least (A) and (B) (furthermore at least one of (C) and (D)) from among (A) to (D) mentioned below. The device I/O comparison unit 2013 may determine the activation order of the two or more HDDs 1040H on the basis of the comparison result and may request the power supply control unit 2004 to activate the two or more HDDs 1040H in the determined activation order.

(A) Issuance destination HDDs of suppressed I/O commands.

(B) HDDs to which the suppressed I/O commands may be issued in parallel.

(C) HDDs with the same I/O priority level described in the device control plan.

(D) HDDs which cannot be activated simultaneously (if they are activated simultaneously, their power will exceed the power limit described later).

According to the examples in FIG. 6 and FIG. 9, the I/O priority levels of HDD1 and HDD2 in the standby state are the same. Furthermore, let us assume that if HDD1 and HDD2 are activated simultaneously (for example, if they reach the peak power simultaneously), their power exceeds the power limit described later. When the I/O number "20" of HDD1 is compared with the I/O number "3" of HDD2, the device I/O comparison unit 2013 sets the activation turn of HDD1 earlier than that of HDD2. This is because the I/O number of HDD1 is larger than that of HDD2. Furthermore, when the I/O size "80 KB" of HDD1 is compared with the I/O size "12 KB" of HDD2, the device I/O comparison unit 2013 sets the activation turn of HDD1 earlier than that of HDD2. This is because the I/O size of HDD1 is larger than that of HDD2.

The I/O management table 8000 and the device I/O management table 9000 described above are stored in, for example, the memory 1010.

FIG. 10 illustrates an example of a system management table.

The system management table 120 is a table associated with system management units and is stored, for example, the memory 1010. A "system management unit" is a unit for system management including a plurality of HDDs 1040H and may be, for example, the server 1000, the storage apparatus 1016, a RAID group, or a logical vice(s) as described in Embodiment 2. In this embodiment, the system management unit is the storage apparatus 1016.

The system management table 120 represents a "device ID" (an ID of the system management unit), a "type" (a type of the system management unit), a "state" (a state of the system management unit), a "power limit" (an upper limit of power consumption by the system management unit), "current power" (power consumption of the system management unit), "deadline time length" (deadline time length for each HDD belonging to the system management unit [a maximum value of the elapsed time length since an I/O command was suppressed for the first time]), and a "device control designation" (a type of I/O quantity adopted to determine the activation order of the HDDs 1040H belonging to the system management unit). When an invalid value such as "−1" is set as the "deadline time length," deadline control will not be performed.

FIG. 11 illustrates an example of a device power management table.

A device power management table 121 is a table existing for each power management unit and is stored in, for example, the memory 1010. The "power management unit" is a unit of power management including one or more HDDs 1040H and may be, for example, the storage apparatus 1016, a RAID group, or a logical device(s) as described in Embodiment 2. In this embodiment, the power management unit is an HDD 1040H. The device power management table 121 represents a "device ID" (an ID of the relevant HDD 1040H), a "type" (a type of the power management unit ("physical" in order to deal with the HDD 1040H)), a "state" (a state of the HDD 1040H), "stop time," "activation time," an "activation time length," "stopping power," "activation power," "standby time length," "peak power," "active power," "idle power," and "standby power." At least one of the "stop time," the "activation time," the "activation time length," the "stopping power," the "activation power," the "standby time length," the "peak power," the "active power," the "idle power," and the "standby power" is a value measured by the power measurement unit 2005. The "stop time," the "activation time," the "activation time length," the "stopping power," the "activation power," the "standby time length," the "peak power," the "active power," the "idle power," and the "standby power" will be explained with reference to FIG. 12.

Figure 12:
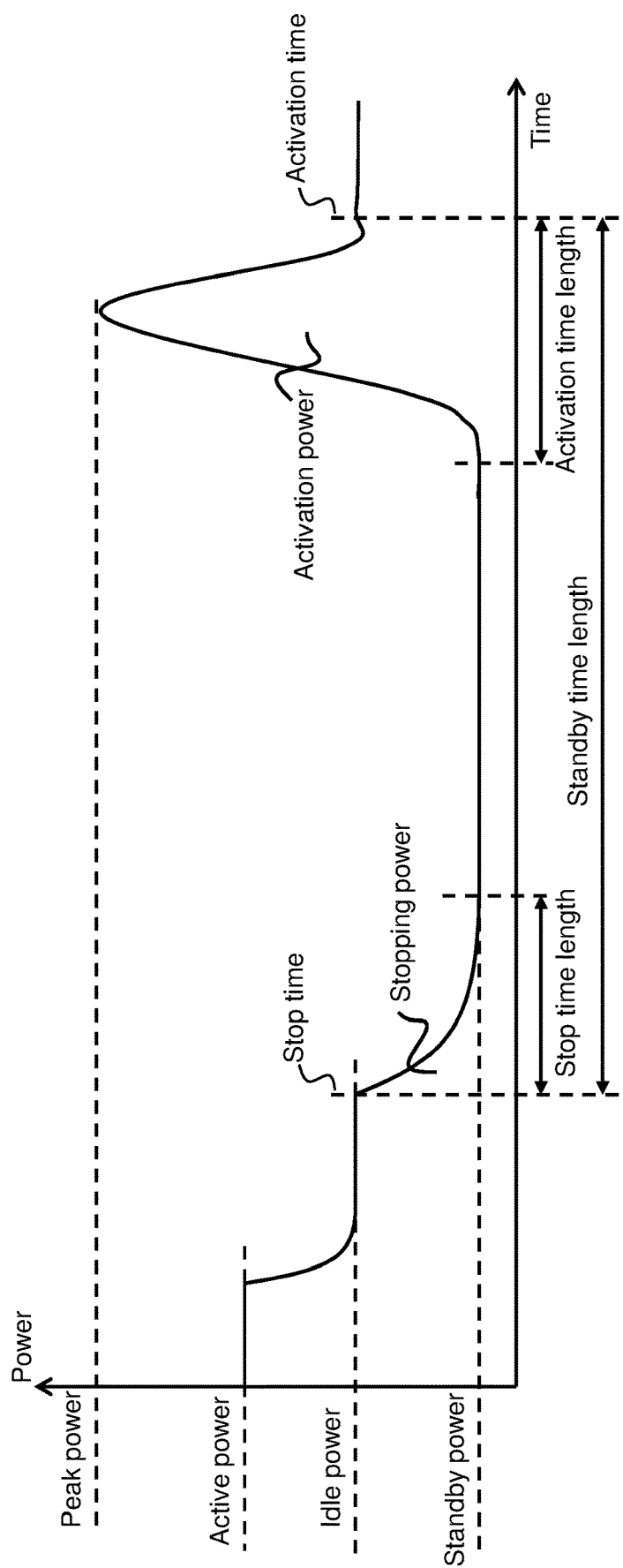
FIG. 12 illustrates an example of power changes of HDDs (Hard Disk Drives)

FIG. 12 illustrates an example of power changes in the HDD 1040H.

The HDD 1040H makes a transition from the active state to the idle state. The "active power" is power consumption in the active state and the "idle power" is power consumption in the idle state.

When the HDD 1040H does not receive an I/O command for a certain period of time after the transition to the idle state, it makes a transition to the standby state. The "stop time" is time when the transition to the standby state is started (for example, spin-down start time). The "stop time length" is a time length from the start of the transition to the standby state until its termination. The "stopping power" is the power consumed to make a transition to the standby state.

When the HDD 1040H receives an activation command after the transition to the standby state (an I/O command may also serve as the activation command), it activates. When the activation of the HDD 1040H is started, the power consumption by the HDD 1040H rises to the peak power. When the power consumption by the HDD 1040H decreases from the peak power to the idle power, the activation of the HDD 1040H terminates. The "activation time" is completion time of the activation (for example, spin-up completion time). The "activation time length" is a time length from the start of the activation until its termination. The "activation power" is the power consumed for the activation. The "HDD activates" means at least starting of the activation and may include the termination of the activation.

The "standby time length" is time from the stop time until the activation time and is time during which the effects of the transition to the standby state can be expected (for example, it can be expected that the reduced power consumption would be larger than a total of the stopping power and the activation power).

In this embodiment, not all the issuance destination HDDs (HHDs which are the issuance destinations of I/O commands) can always be activated simultaneously. Information including the "power limit" and the "current power" mentioned above, the power consumed to activate the HDDs 1040H (for example, the "peak power" and the "activation power"), the number of the HDDs 1040H in the activated state (typically in the active state or the idle state) is an example of limitation information about limitations on the number of the HDDs 1040H which can be activated simultaneously. The number of the HDDs 1040H which can be activated simultaneously is determined based on such control information.

An example of processing executed in this embodiment will be explained below.

Figure 13:
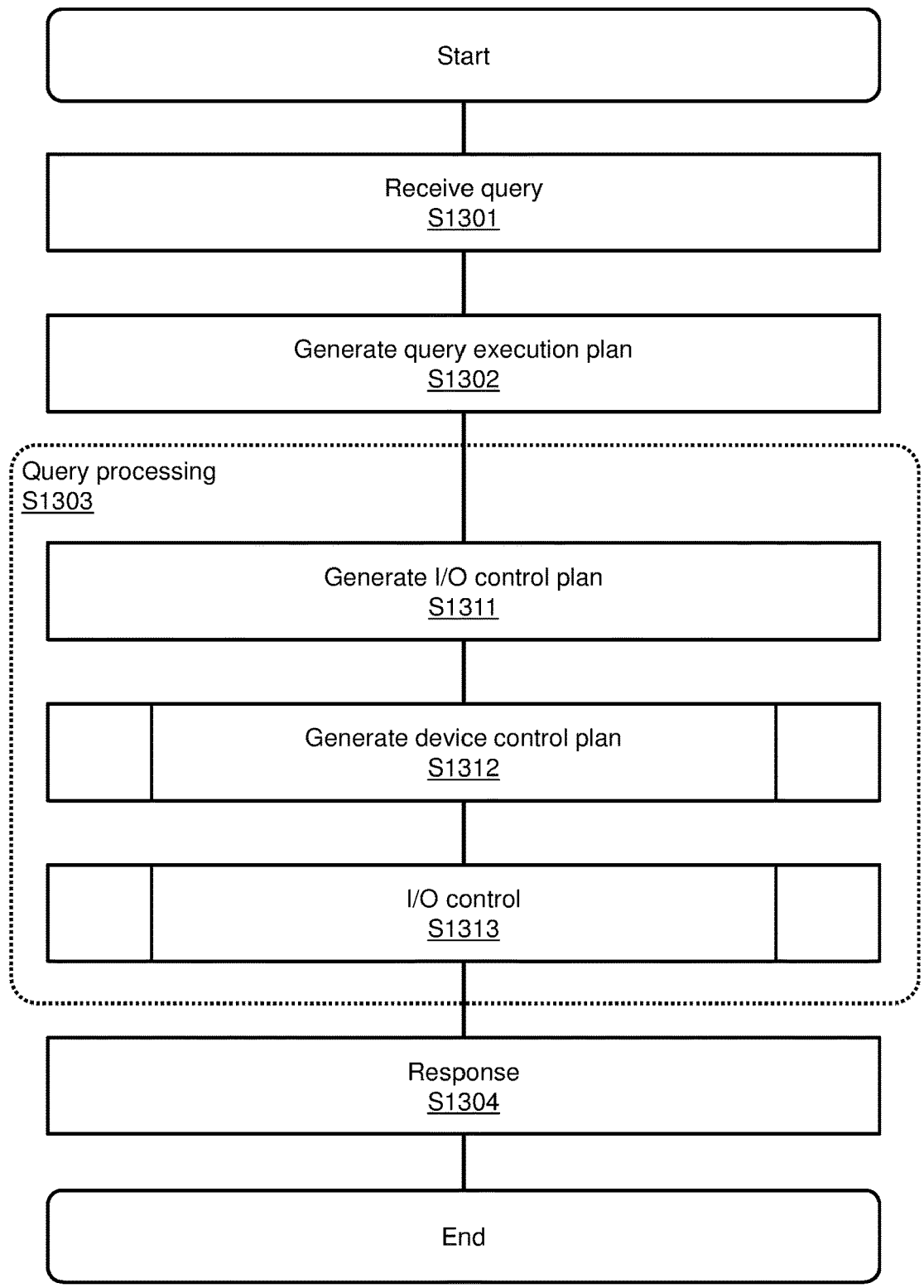
FIG. 13 illustrates an entire flow from reception of a query to a response.

FIG. 13 illustrates the entire flow from the acceptance of a query to a response.

In S1301, the query reception unit 1021 accepts a query 3000 (for example, FIG. 3) from the client.

In S1302, the execution plan generation unit 1022 generates a query execution plan 4000 (for example, FIG. 4) based on the query 3000 accepted in S1301.

In S1303, processing of the query 3000 accepted in S1301 is executed. Specifically speaking, a plurality of I/O commands are issued from the query execution unit 1023 to the storage apparatus 1016 on the basis of the query execution plan 4000 generated in S1302. The I/O management table 8000 (FIG. 8) is updated with respect to each issued I/O command.

During the query processing in S1303, for example, the following processing is executed.

In S1311, the I/O control plan generation unit 2001 generates the I/O control plan 5000 (for example, FIG. 5) on the basis of the query execution plan 4000 generated in S1302. The I/O control plan generation unit 2001 transmits, for example, the I/O control plan 5000 to the device control plan generation unit 2002.

In S1312, the device control plan generation unit 2002 generates the device control plan 6000 (for example, FIG. 6) on the basis of the I/O control plan 5000 generated in S1303.

In S1313, the device control unit 2003 suppresses the issuance of I/O commands to the HDDs 1040H described in the device control plan 6000 generated in S1304 and determines the activation order of the HDDs 1040H on the basis of the device control plan 6000 and the I/O quantities of the issuance destination HDDs 1040H of suppressed I/O commands. The power supply control unit 2004 activates the HDDs 1040H in the determined activation order. The suppressed I/O commands are issued to the activated HDDs 1040H (the suppression of the I/O commands is cancelled). The query execution unit 1023 stores one or more responses to the one or more I/O commands issued to the activated HDDs 1040H in the memory 1010.

In S1304, the query execution unit 1023 returns a response to the query 3000 to the client 1030 on the basis of the response(s) (the response(s) in the memory 1010) to the I/O commands based on the query 3000 accepted in S1301. The response to the query 3000 is returned to the client 1030 on the basis of those responses.

The entire flow from the acceptance of the query 3000 to the response has been described above.

Figure 14:
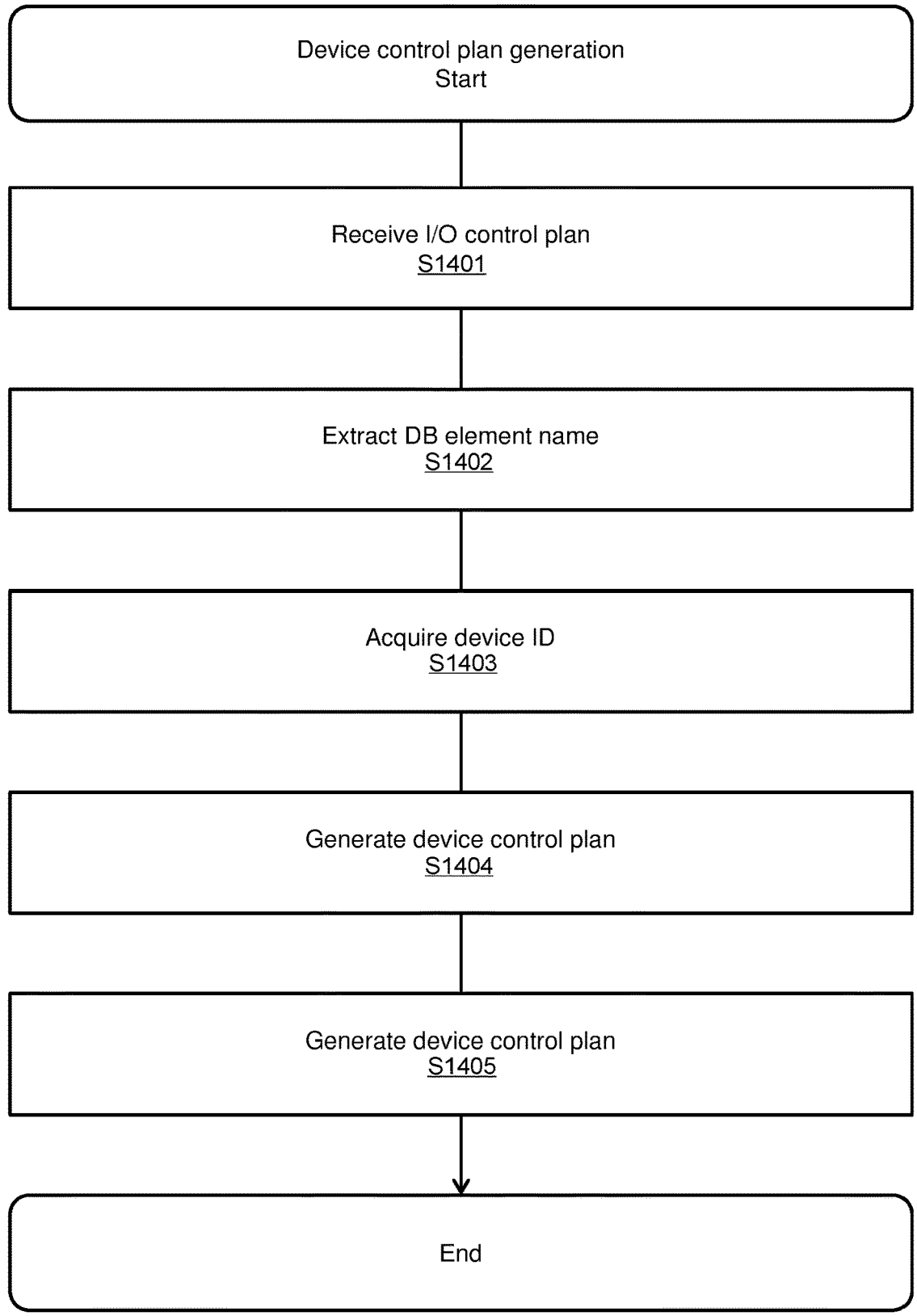
FIG. 14 illustrates a flow of device control plan generation (S1312 in FIG. 13)

FIG. 14 illustrates a flow of device control plan generation (S1312 in FIG. 13).

In S1401, the device control plan generation unit 2002 receives the I/O control plan 5000 from the I/O control plan generation unit 2001.

In S1402, the device control plan generation unit 2002 extracts the DB element name (for example, "ADBUSER01.Indext.PART") from the I/O control plan 5000.

In S1403, the device control plan generation unit 2002 acquires the device ID (for example, "HDD1") corresponding to the extracted DB element name (for example, "ADBUSER01.Indext.PART") from the data storage table 7000.

In S1404, the device control plan generation unit 2002 generates the device control plan 6000 on the basis of the acquired device ID and the I/O priority level corresponding to the DB element name corresponding to the device ID.

In S1405, the device control plan generation unit 2002 transmits the device control plan 6000 to at least the device control unit 2003 from among the device control unit 2003 and the power supply control unit 2004.

Figure 15:
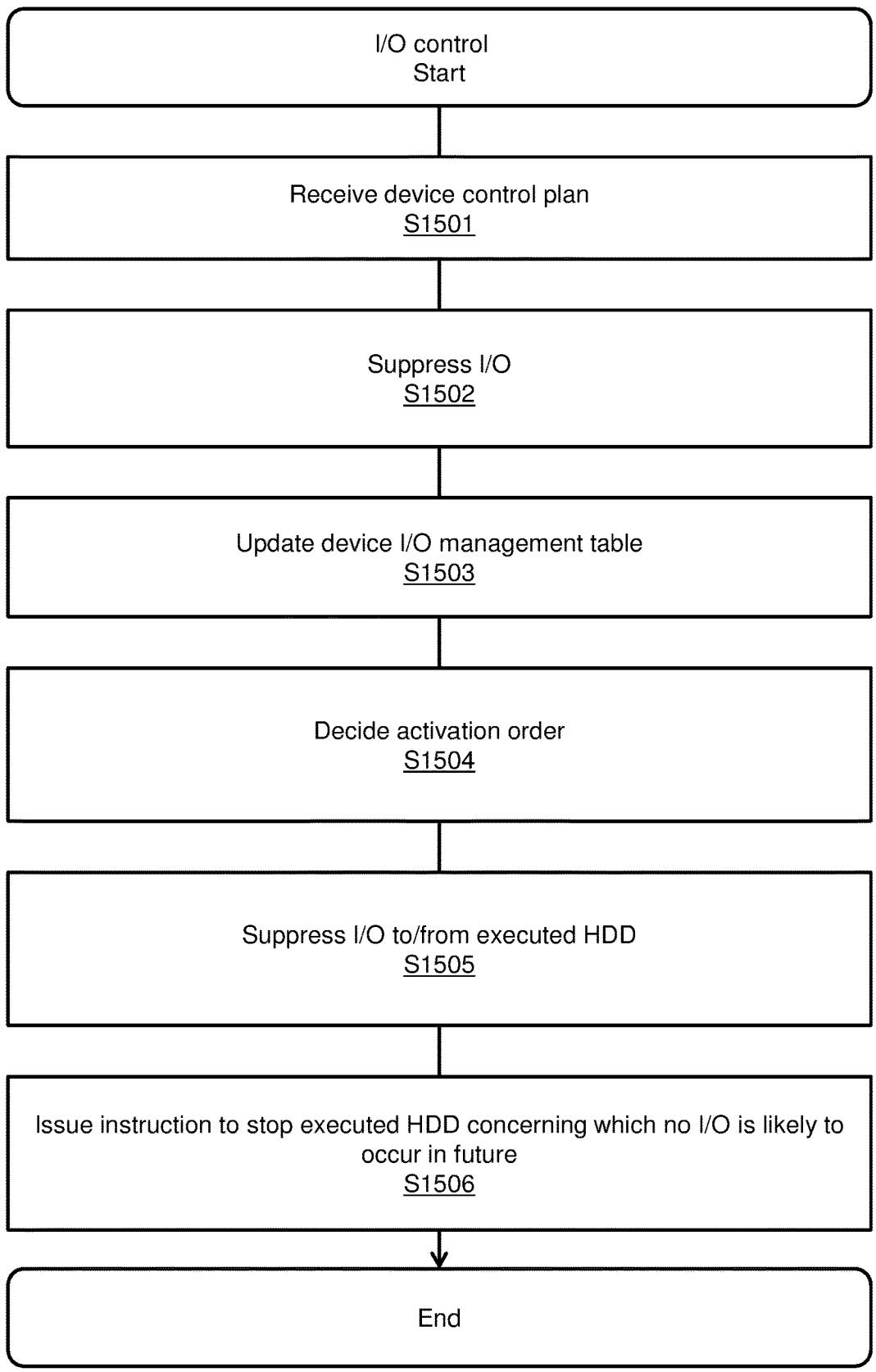
FIG. 15 illustrates a flow of I/O control (S1313 in FIG. 13)

FIG. 15 illustrates a flow of I/O control (S1313 in FIG. 13).

In S1501, the device control unit 2003 receives the device control plan 6000 from the device control plan generation unit 2002.

In S1502, the I/O block unit 2011 suppresses the issuance of I/O commands to the HDDs 1040H described in the device control plan 6000. However, regarding the HDDs 1040H in the activated state (for example, the active state or the idle state), the I/O block unit 2011 does not suppress the issuance of the I/O commands. In other words, an I/O command for an HDD 1040H in the activated state is issued to that HDD 1040H without being suppressed.

In S1503, the device I/O measurement unit 2012 updates the device I/O management table 9000 corresponding to the issuance destination HDDs 1040H corresponding to the relevant suppressed I/O command on the basis of the I/O management table 8000 corresponding to the suppressed I/O command. For example, the number of the suppressed I/O commands and the size according to the suppressed I/O commands are added to the "I/O number" and the "I/O size," respectively. Incidentally, the "I/O number," the "I/O size," and the "elapsed time length" in the I/O management table 8000 are values at a certain point in time during processing of one or more queries 3000. For example, when a plurality of queries 3000 are processed in parallel, each of the "I/O number" and the "I/O size" in the I/O management table 8000 is a value in the parallel processing of the plurality of queries 3000. Furthermore, when two or more tasks are generated and executed in parallel with respect to the one or more queries 3000, each of the "I/O number" and the "I/O size" in the I/O management table 8000 is a value in the parallel processing of the two or more tasks. Incidentally, the "I/O number" and the "I/O size," that is, the "I/O quantity" may not be an actual measurement value. For example, the device I/O measurement unit 2012 may predict the "I/O quantity" based on the query execution plan 4000. One of techniques used by the execution plan generation unit 1022 to create the query execution plan 4000 is so-called cost-based optimization. This is a technique that predicts the number of transactions and a data read amount upon sequential access on the basis of statistic information, calculates a cost value corresponding to the I/O throughput and the CPU processing amount from the predicted value, and makes a selection to reduce the cost value. The predicted number of transactions or the predicted value of the data read amount is included in the query execution plan 4000 and the device I/O measurement unit 2012 predicts the "I/O quantity" from this value. For example, in a case of random I/O, a value calculated by multiplying the predicted number of transactions by a constant (example: 2) is the "I/O number" and a value calculated by multiplying the above-obtained value by a predetermined constant (example: 4 KiB) is the "I/O size."

In a case of sequential I/O, a predicted data read amount is the "I/O size" and a value calculated by dividing the predicted data read amount by a constant is the "I/O number." When data are stored in a plurality of devices, the "I/O number" or the "I/O size" is divided in accordance with predetermined rules (example: to assign it equally to each device or to assign it in proportion to the size used for data storage). Furthermore, the device I/O measurement unit 2012 may set the "I/O quantity" by using information from the execution in the past. In this case, the execution plan generation unit 1022 generates the same query execution plan 4000 with respect to queries which are judged to be the same. The same I/O control plan 5000 is generated for the same query execution plan 4000. Therefore, identification information (example: an identifier of the generated control plan or a hash value generated from the generated control plan) of the relevant query execution plan 4000 or I/O control plan 5000 is recorded in the device control plan 6000. The device I/O measurement unit 2012 saves "I/O quantities" in the past, recognizes the relevant retained "I/O quantity" in the past from the query execution plan 4000 or the I/O control plan 5000 recorded in the device control plan 6000, and sets that value.

In S1504, the device I/O comparison unit 2013 determines the activation order of waiting HDDs 1040H on the basis of the "I/O number," the "I/O size," and the "elapsed time length" of the device I/O management table 9000 corresponding to the waiting HDDs 1040H described in the device control plan 6000 (the HDDs 1040H concerning which the issuance of I/O commands is suppressed). The device I/O comparison unit 2013 requests the power supply control unit 2004 to activate the waiting HDDs 1040H in the determined activation order. Regarding the determination of the activation order, at least one of the following examples (01 to 08) may be adopted.

(01) When the "device control designation" described in the system management table 120 is the "I/O number," the "I/O number" is adopted (or is most highly prioritized) as the I/O quantity which is the comparison target.

(02) When the "device control designation" described in the system management table 120 is the "I/O size," the "I/O size" is adopted (or is most highly prioritized) as the I/O quantity which is the comparison target.

(03) When the I/O type is the random I/O, the "I/O number" is adopted (or is most highly prioritized) as the I/O quantity which is the comparison target. When the storage device(s) is a random device(s) in addition to the fact that the I/O type is the random I/O, the "I/O number" may be adopted (or be most highly prioritized) as the I/O quantity which is the comparison target. The "random device(s)" means a high-speed storage device(s) capable of the random I/O (such as an HDD(s) or SSD(s) (Solid State Drive(s))) as compared to a sequential device(s) described later.

(04) When the I/O type is the sequential I/O, the "I/O size" is adopted (or is most highly prioritized) as the I/O quantity which is the comparison target. When a storage device(s) is a sequential device(s) in addition to the fact that the I/O type is the sequential I/O, the "I/O size" may be adopted (or be most highly prioritized) as the I/O quantity which is the comparison target. The "sequential device(s)" is a storage device(s) (such as a tape(s)) whose speed is higher for the sequential I/O than for the random I/O.

(05) When the number of HDDs 1040H of the same I/O priority level exceeds the number of HDDs identified based on the aforementioned control information (the number of the HDDs 1040H which can be activated simultaneously), the activation order of at least the HDDs 1040H of the same I/O priority level is determined.

(06) When the "I/O number" is adopted (or is most highly prioritized) as the I/O quantity, the activation turn of a waiting HDD 1040H with a larger "I/O size" is earlier. Regarding waiting HDDs 1040H with the same "I/O number," the activation turn of a waiting HDD 1040H with a larger "I/O size" may be earlier.

(07) When the "I/O size" is adopted (or is most highly prioritized) as the I/O quantity, the activation turn of a waiting HDD 1040H with a larger "I/O number" is earlier. Regarding waiting HDDs 1040H with the same "I/O number," the activation turn of a waiting HDD 1040H with a larger "I/O size" may be earlier.

(08) The activation turn of each waiting HDD 1040H is based on the "elapsed time length" described in the device I/O management table 9000 corresponding to the waiting HDD 1040H, the "deadline time length" described in the system management table 120, and the "activation time length" described in the device power management table 121 corresponding to the waiting HDD 1040H. The activation turn of a waiting HDD 1040H where the relationship of "deadline time length"−"activation time length"="elapsed time length" is established may be most highly prioritized regardless of the I/O quantity (the "I/O number" or the "I/O size"). As a result, a state of a small I/O quantity is maintained and it is thereby possible to avoid the I/O commands from being kept suppressed forever. Furthermore, since the suppression of the I/O commands is cancelled early as much as the activation time length, it can be expected that a response for the I/O command may be received as closer to the time when the deadline time length passes as possible.

The device I/O comparison unit 2013 can determine the activation order regularly. Furthermore, the device I/O comparison unit 2013 can determine and report the activation order in response to an instruction from the power supply control unit 2004.

In S1505, when the waiting HDD 1040H becomes the executed HDD 1040H (when the waiting HDD 1040H is activated and returns a response to an I/O command), the I/O block unit 2011 suppresses the issuance of an I/O command if any I/O command is issued to the executed HDD 1040H. Furthermore, the "I/O number," the "I/O size," and the "elapsed time length" in the device I/O management table 9000 corresponding to the executed HDD 1040H is updated by the device I/O measurement unit 2012 in accordance with the executed I/O command.

In S1506, when both the "I/O number" and the "I/O size" corresponding to the executed HDD 1040H are "0" (that is, any new suppressed I/O command has not occurred) and it can be identified from the device control plan 6000 that no I/O to the executed HDD 1040H is likely to occur in the future (no I/O is likely to occur within a certain period of time), the device I/O comparison unit 2013 issues an instruction to the power supply control unit 2004 to stop the identified executed HDD 1040H (transition to the standby state). Incidentally, the power supply control unit 2004, instead of the device I/O comparison unit 2013, can identify the HDD 1040H concerning which no I/O is likely to occur in the future, from the device control plan 6000. Specifically speaking, the power supply control unit 2004 may stop the identified HDD 1040H without receiving the instruction to stop the HDD 1040H from the device I/O comparison unit 2013.

Figure 16:
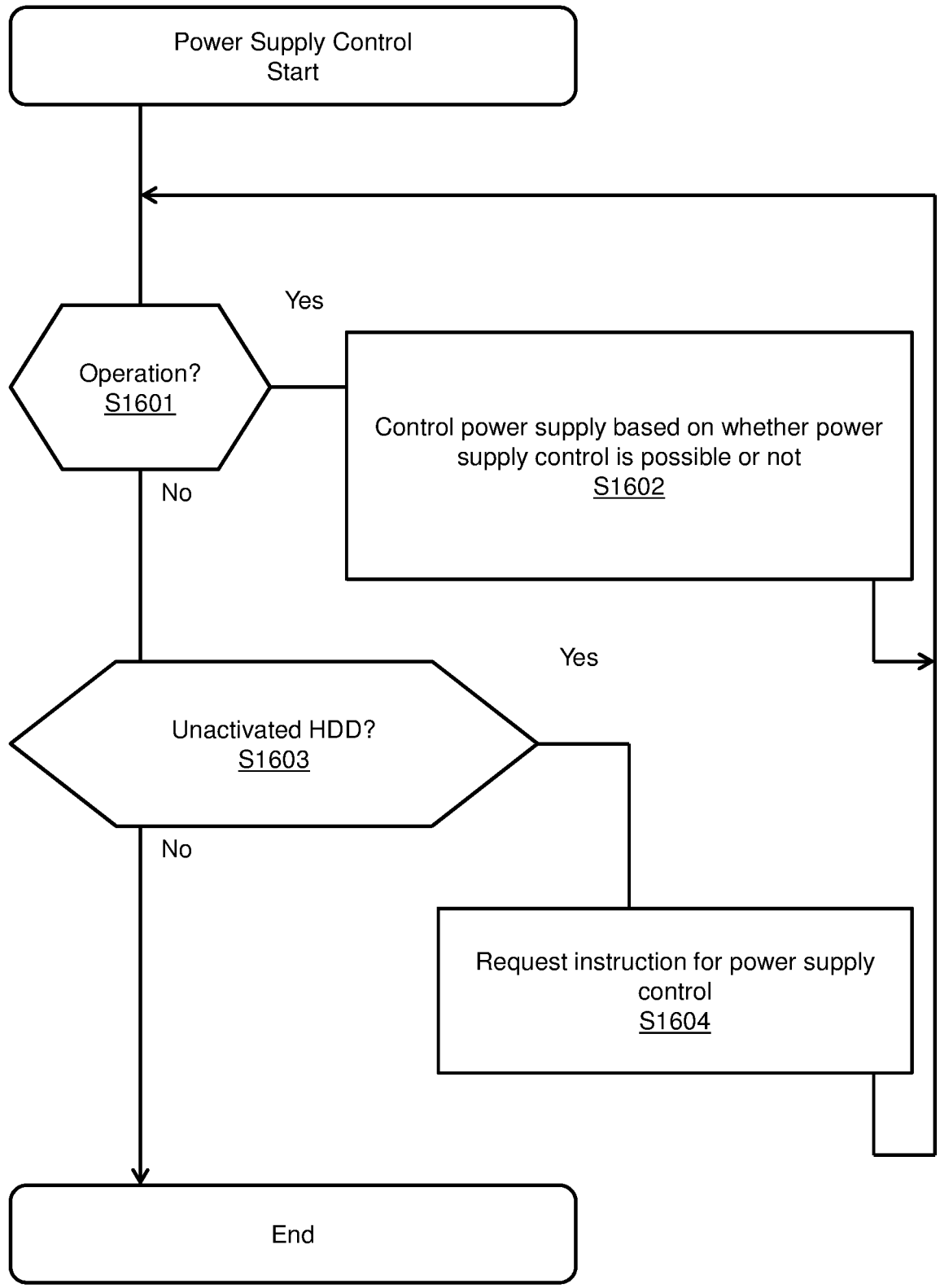
FIG. 16 illustrates a flow of power supply control.

FIG. 16 illustrates a flow of power supply control.

In S1601, the power supply control unit 2004 judges whether a device operation is received or not. The "device operation" is notification of the activation order or the instruction to stop the HDD 1040H.

When the judgment result of S1601 is true (S1601: Yes), the power supply control unit 2004 performs the power supply control in S1602 on the basis of the "power limit" and the "current power" described in the system management table 120 and the device power management table 121 of each HDD 1040H.

For example, the power supply control unit 2004 judges whether a sum of the "current power" and the "activation power" ("peak power") of an activation target HDD (an HDD whose turns to be activated has come) 1040H is equal to or less than a "power supply limit" or not. If the judgment result is true, the power supply control unit 2004 activates the activation target HDD 1040H.

Furthermore, for example, the power supply control unit 2004 judges whether a sum of the "current power" and the "stopping power" of the stop target HDD 1040H is equal to or less than the "power supply limit" or not. If the judgment result is true, the power supply control unit 2004 stops the stop target HDD 1040H. The "stop target HDD" is, for example, an HDD identified by the device control plan 6000 as an HDD concerning which no I/O is likely to occur in the future, and may be an HDD designated by the stop instruction from the device I/O comparison unit 2013 or may be an HDD identified as a stop target by the power supply control unit 2004.

If the judgment result in S1601 is false (S1601:No), the power supply control unit 2004 judges whether there is any HDD 1040H, which has not been activated yet, in the device control plan 6000 or not in S1603.

If the judgment result in S1603 is true (S1603: Yes), the power supply control unit 2004 requests an instruction about the power supply control from the device I/O comparison unit 2013 in S1604. In response to this request, the device I/O comparison unit 2013 determines (updates) the activation order.

Embodiment 1 has been explained above.

Figure 17:
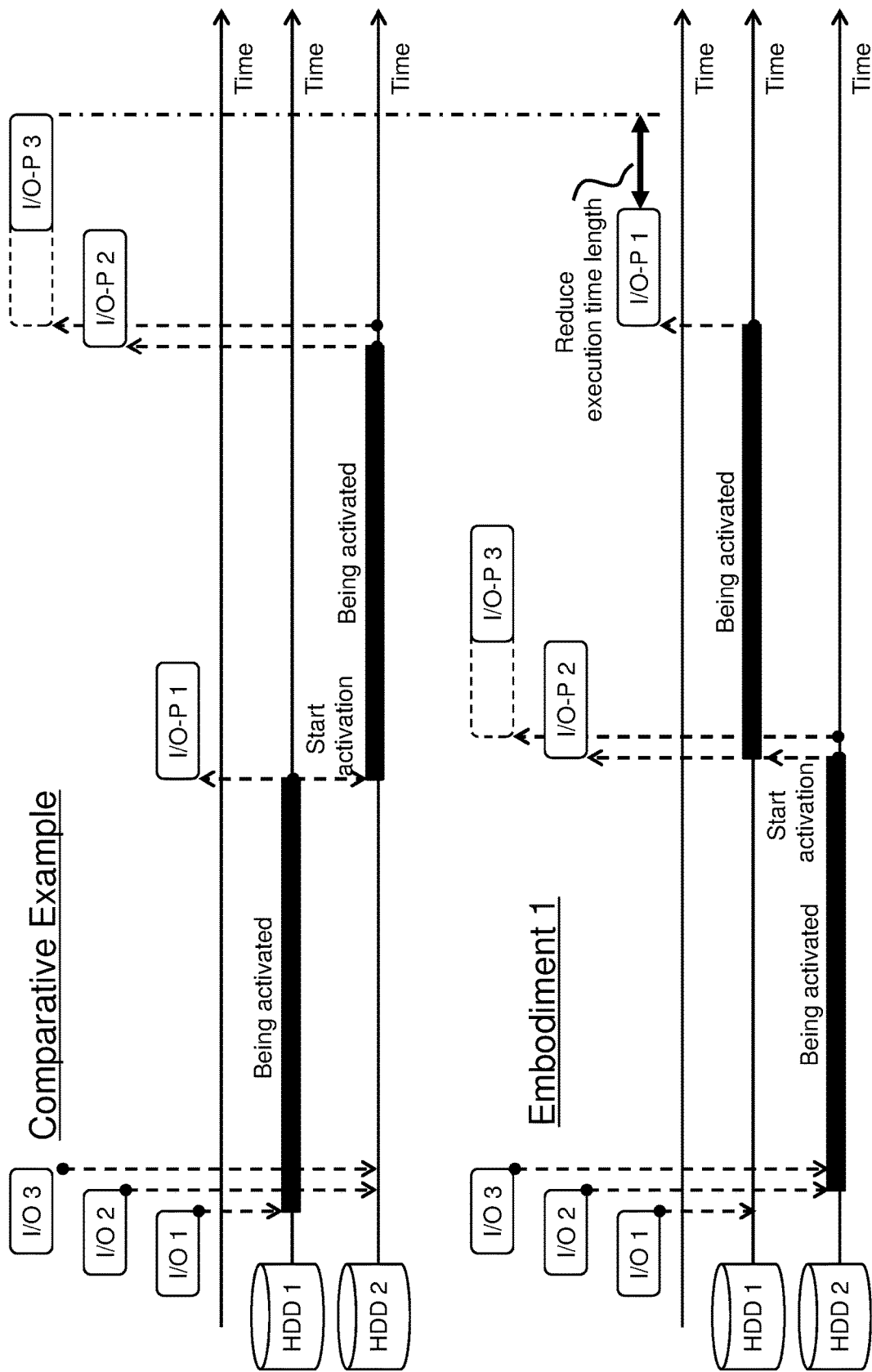
FIG. 17 is a schematic diagram illustrating an example of reduction of time required for processing of a plurality of I/O commands.

FIG. 17 is a schematic diagram illustrating an example of reduction of time required for processing of a plurality of I/O commands.

Let us assume that there are I/O commands 1 to 3. Let us assume that the I/O commands are issued in the order of the I/O commands 1, 2, and 3. Let us assume that an issuance destination of one I/O command 1 is HDD1 and issuance destinations of two I/O commands 2 and 3 are HDD2. Furthermore, referring to FIG. 17, I/O processing k corresponding to I/O command k (k=any one of 1 to 3) is described as "I/O-P k." Incidentally, the "I/O processing k" is response processing for the I/O command k.

According to a comparative example, the HDDs are activated in the order of I/O. Therefore, the HDDs are activated in the order of HDD1 and then HDD2. Then, I/O processing 1 is executed during the activation of HDD2 and I/O processing 2 and 3, that is, two sets of I/O processing are executed after the completion of the activation of HDD2.

Meanwhile, according to this embodiment, the HDDs are activated in descending order of the I/O quantity. Therefore, the HDDs are activated in the order of HDD2 and then HDD1. Then, the execution of the I/O processing 2 and 3 corresponding to the two I/O commands 2 and 3 is completed during the activation of HDD1 and it is only necessary for one I/O processing 1 to be executed after the completion of the activation of HDD1. In other words, in this embodiment, the device control system 1012 performs control so that an I/O command for a storage device concerning which the amount of time to respond to an I/O command after the issuance of the I/O command (processing time) is long is issued earlier than an I/O command for a storage device with shorter processing time.

It takes time to active an HDD(s). Specifically speaking, the amount of time called the activation time length is required in order for an HDD to change its state from the standby state to the activated state. In this embodiment, it is possible to execute many sets of I/O processing during activation time lengths before the last activation time length and minimize the number of I/O processing after the last activation time length. As a result, in this embodiment, a reduction of time required for processing of a plurality of I/O commands based on one or more queries 3000 can be expected. Incidentally, a specific example of FIG. 17 shows that HDD1 is activated after the completion of the activation of HDD2; however, this embodiment is not limited to this example. For example, HDD1 may be activated during the activation of HDD2 unless the total power consumption of the plurality of HDDs exceeds the power limit.

Embodiment 2

Embodiment 2 will be explained. In doing so, the differences from Embodiment 1 will be mainly explained and common points shared with Embodiment 1 will be omitted or summarized.

Figure 18:
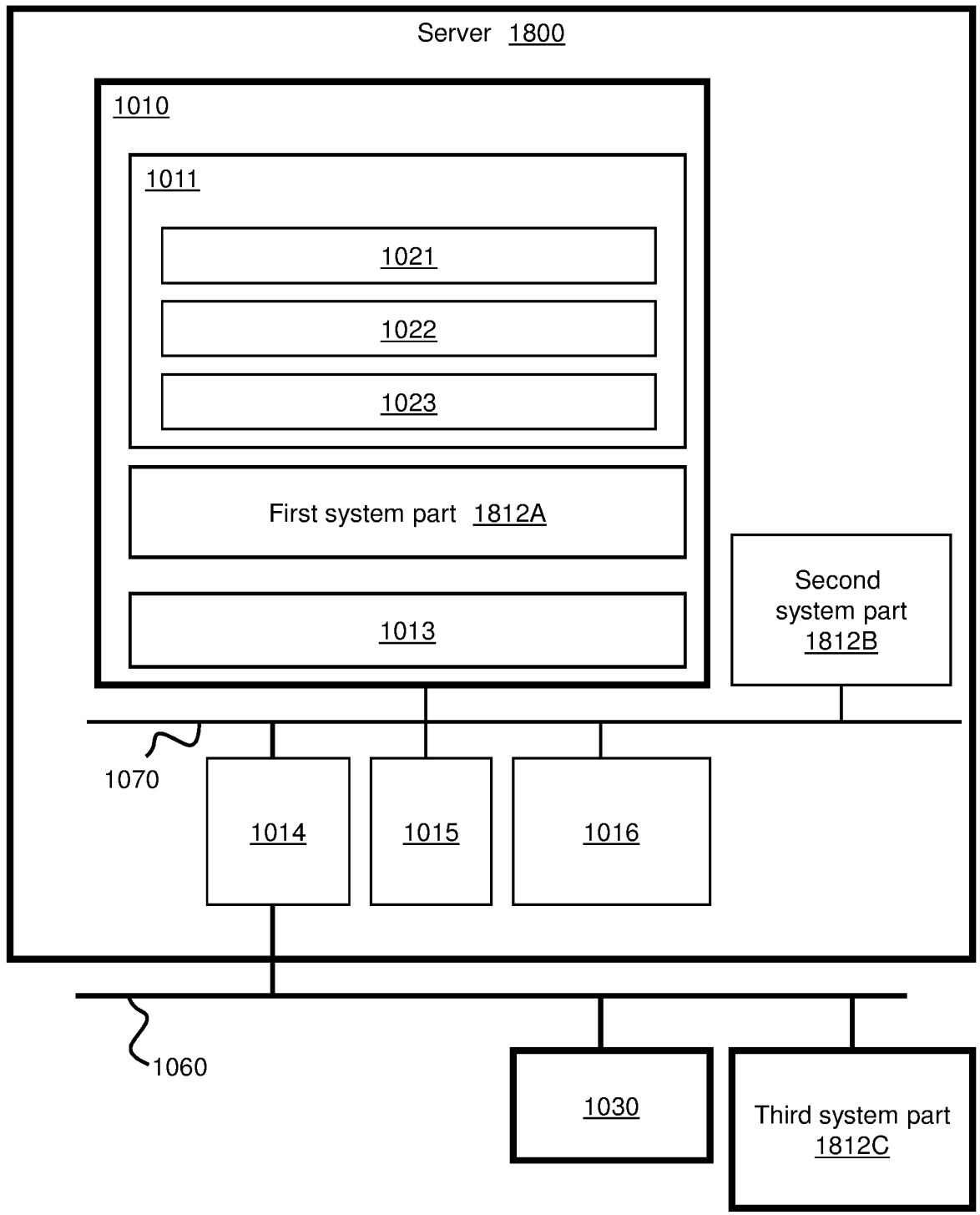
FIG. 18 illustrates the configuration of a data management system according to Embodiment 2.

FIG. 18 illustrates the configuration of a data management system according to Embodiment 2.

A device control system is distributed as a plurality of system parts inside and outside a server 1800. Specifically speaking, for example, a first system part 1812A and a second system part 1812B exist inside the server 1800. A third system part 1812C exists outside the server 1800 (the third system part 1812C is coupled to, for example, an external network 1060). The system parts 1812A to 1813C include the I/O control plan generation unit 2001, the device control plan generation unit 2002, the I/O block unit 2011, the device I/O measurement unit 2012, the device I/O comparison unit 2013, the power supply control unit 2004, and the power measurement unit 2005 described earlier. The same component of the device control system does not have to exist redundantly in the system parts 1812A to 1813C. Each of the second system part 1812B and the third system part 1812C may be a hardware circuit (device) or a computer including a processor and a memory.

In Embodiment 2, the server 1800 including the system parts 1812A and 1812B, and the system part 1812C are an example of the computer system.

Embodiment 3

Embodiment 3 will be explained. In doing so, the differences from Embodiments 1 and 2 will be mainly explained and common points shared with Embodiments 1 and 2 will be omitted or summarized.

Figure 19:
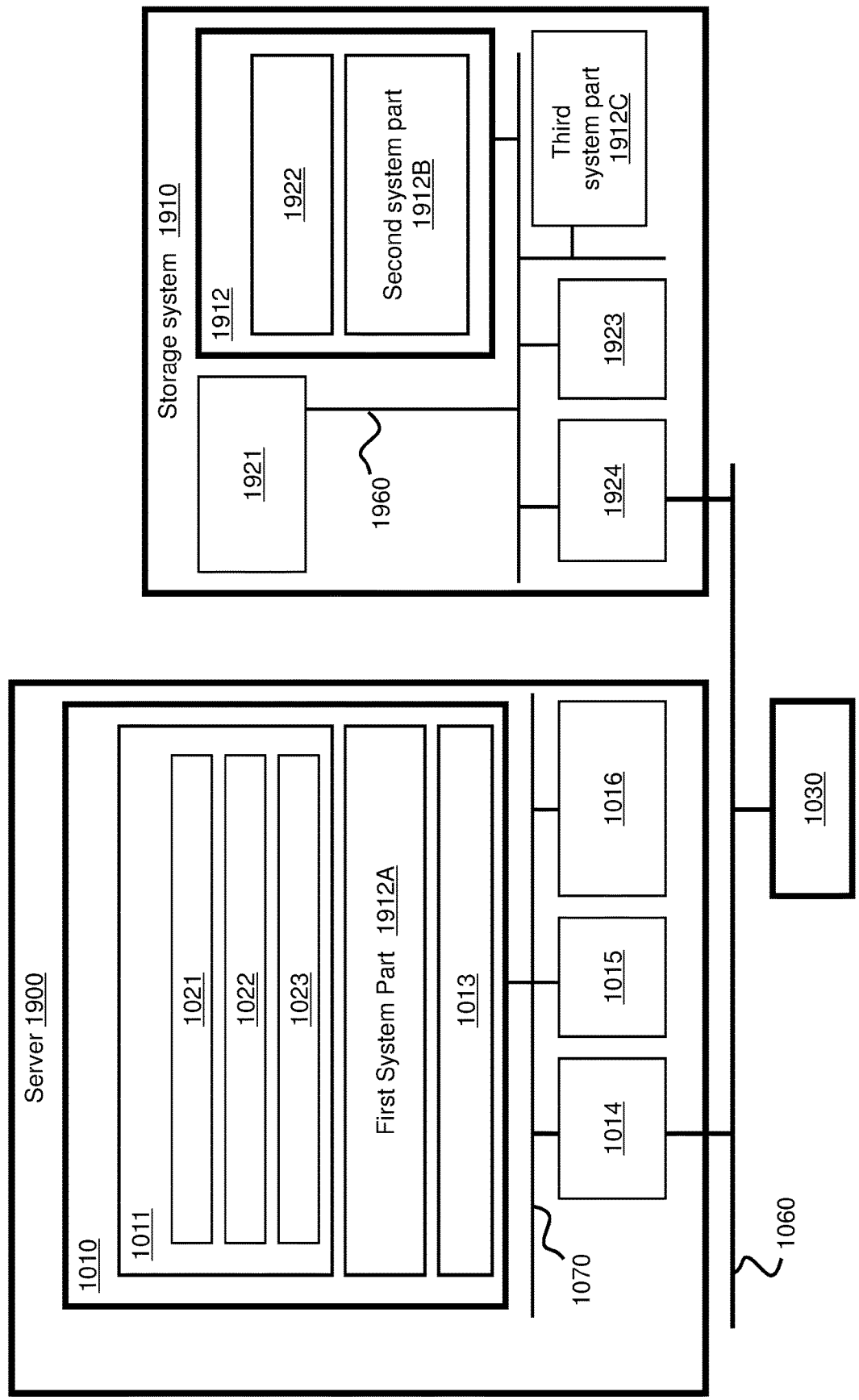
FIG. 19 illustrates the configuration of a data management system according to Embodiment 3.

FIG. 19 illustrates the configuration of a data management system according to Embodiment 3.

A storage system 1910 is coupled to a server 1900 via the external network 1060. A device control system is distributed inside and outside the server 1900, that is, in the server 1900 and the storage system 1910. More specifically, for example, a first system part 1912A exists in the server 1900 and a second system part 1912B and a third system part 1913B exist in the storage system 1910.

Incidentally, in this embodiment, the server 1900 issues an I/O instruction based on a query from the client 1030 to the storage system 1910. The storage system 1910 includes an internal network 1960. The internal network 1960 includes a storage apparatus (a plurality of storage devices) 1921, a memory 1912, a network card 1924 coupled to the external network 1060, a third system part 1812C, and a processor 1923. The storage apparatus 1921 includes one or more RAID groups. The memory 1912 stores a storage control program 1922 and a second system part 1912B. The processor 1923 executes I/O to the storage apparatus 1921 in accordance with an I/O instruction from the server 1900 by executing the storage control program 1922.

It is desirable that the device power management table 1100 for each power management unit (for example, each storage device) be stored in the memory 1912 for the storage system 1910. At least part of a database may be stored in at least the storage apparatus 1921 from among the storage apparatuses 1016 and 1921.

Embodiment 4

Embodiment 4 will be explained. In doing so, the differences from Embodiments 1 to 3 will be mainly explained and common points shared with Embodiments 1 to 3 will be omitted or summarized.

Figure 20:
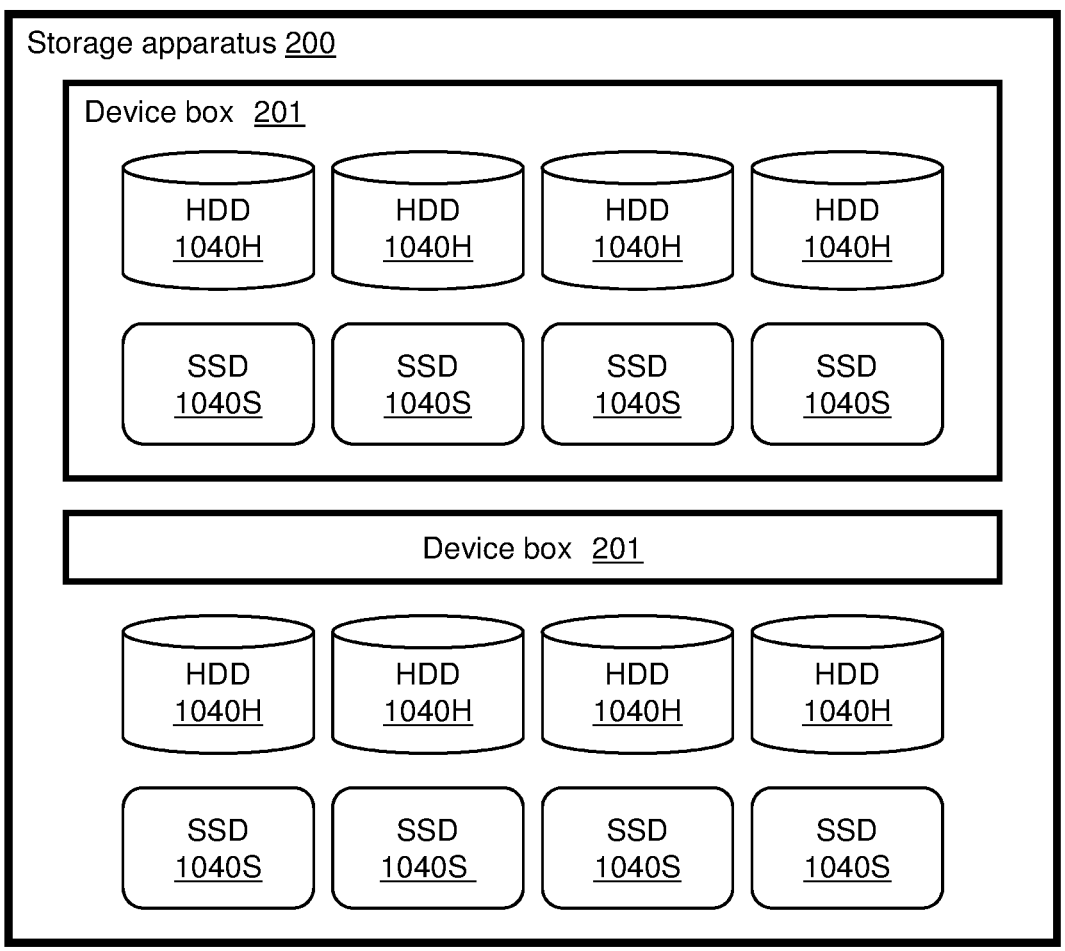
FIG. 20 illustrates a configuration example of a storage apparatus according to Embodiment 4.

FIG. 20 illustrates a configuration example of a storage apparatus according to Embodiment 4.

A storage apparatus 200 may be adopted instead of at least one of the storage apparatuses 1016 and 1921. The storage apparatus 200 includes a plurality of storage devices 1040 including different types of storage devices 1040. For example, the storage apparatus 200 includes a plurality of HDDs 1040H and a plurality of SSDs 1040S.

The storage apparatus 200 may include a plurality of device boxes 201. Each device box 201 may include the same type or different types of pluralities of storage devices 1040.

The device power management table 1100 may be prepared for each device box 201. Furthermore, the device power management table 1100 may be prepared for each storage device 1040 in the device box 201. In other words, the power management unit may be the device box 201 or the storage device 1040.

Embodiment 5

Embodiment 5 will be explained. In doing so, the differences from Embodiments 1 to 4 will be mainly explained and common points shared with Embodiments 1 to 4 will be omitted or summarized.

Figure 21:
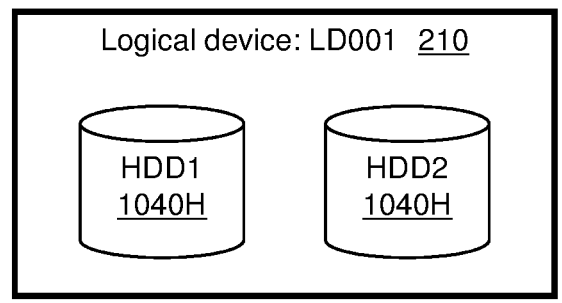
FIG. 21 illustrates an example of a logical device according to Embodiment 5.

FIG. 21 illustrates an example of a logical device according to Embodiment 5.

One logical device 210 can be generated based on one or more storage devices 1040. The logical device 210 is typically a logical volume.

In this embodiment, it is desirable that the device ID of a storage device 1040 which is a physical device be described as the device ID in the device control plan 6000. This is because if the device ID of the logical device 210 is described, it would be difficult to intentionally perform the power supply control of storage devices 1040 in a case where a plurality of logical devices are generated from one physical device. Meanwhile, a device control plan for logical devices and a device control plan for physical devices can be generated as the device control plan. If the device control plan for the logical devices is used, there is a possibility to reduce processing load on the device control unit.

At least one of the system management table 120 and the device power management table 121 may exist with respect to each logical device 210.

Incidentally, in this embodiment, for example, a data storage table 225 illustrated by the example in FIG. 22 is adopted instead of the data storage table 7000 illustrated by the example in FIG. 7. The data storage table 225 retains a DB element name and a device ID with respect to each DB element. The device ID is an ID of a logical device 210. In other words, DB elements such as an index and a DB table are stored in the logical device 210.

Furthermore, in this embodiment, for example, a device ID conversion table 226 which is illustrated the example in FIG. 23 is prepared. The device ID conversion table 226 is stored in the memory for the server or the storage system. The device ID conversion table 226 represents the correspondence relationship between a device ID of a logical device 210 and a device ID of a storage device (physical device) 1040.

When I/O occurs with respect to a logical device 210, one or more storage devices 1040 (the device ID(s) corresponding to the device ID of the logical device 210 [the device ID(s) of the storage device(s) 1040]) on which the logical device 210 is based are identified on the basis of the device ID conversion table 226. An I/O command is issued to at least one of the identified one or more storage devices 1040.

Embodiment 6

Embodiment 6 will be explained. In doing so, the differences from Embodiments 1 to 5 will be mainly explained and common points shared with Embodiments 1 to 5 will be omitted or summarized.

Figure 24:
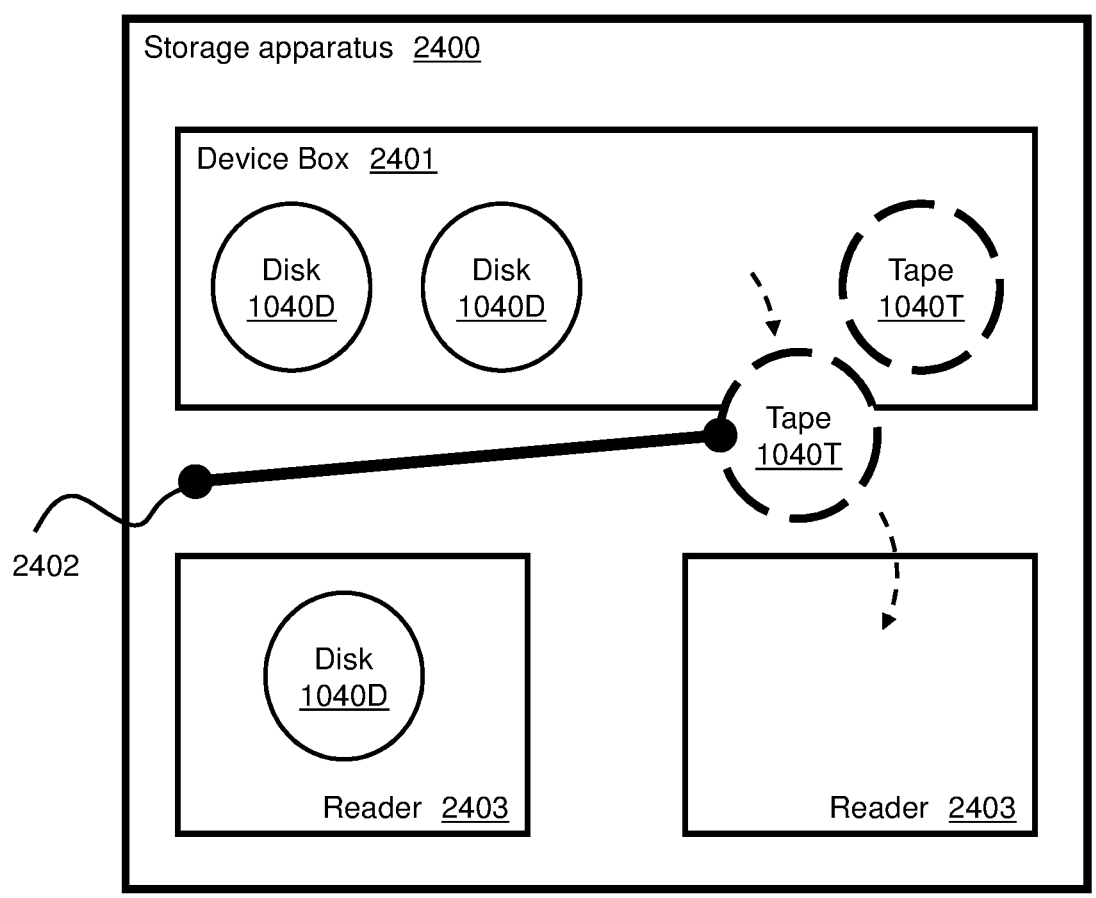
FIG. 24 illustrates a configuration example of a storage apparatus according to Embodiment 6.

FIG. 24 illustrates a configuration example of a storage apparatus according to Embodiment 6.

A storage apparatus 2400 may be adopted instead of at least one of the storage apparatuses 1016 and 1921.

The storage apparatus 240 includes a device box 2401, storage device readers (hereinafter referred to as the readers) 2403, and a device conveyance unit 2402.

The device box 2401 includes a plurality of storage devices 1040. In this embodiment, the plurality of storage devices 1040 are optical disks 1040D and tapes 1040T.

A storage device 1040 can be set to, or removed from, a reader 2403. I/O is performed according to an I/O command to the storage device 1040 via the reader 2403 to which the storage device 1040 is set.

The device conveyance unit 2402 receives an activation instruction from the device control system, removes a storage device 1040 designated by the activation instruction from the device box 2401, conveys the removed storage device 1040 to the reader 2403, and sets the storage device 1040 to the reader 2403. Furthermore, the device conveyance unit 2402 receives a stop instruction from the device control system, removes a storage device 1040 designated by the stop instruction from the reader 2403, conveys the removed storage device 1040 to the device box 2401, and returns the storage device 1040 to the device box 2401.

The number of the readers 2403 is less than the number of the storage devices 1040.

In this embodiment, a storage device 1040 in the non-activated state is a storage device 1040 which is not set to any one of the readers 2403, specifically speaking, a storage device 1040 existing in the device box 2401.

Furthermore, the activation of a storage device 1040 in the non-activated state is to set the storage device 1040 to any one of the readers 2403 by removing the storage device 1040 from the device box 2401 and conveying it to the reader 2403. Consequently, an activation time length occurs.

Furthermore, in this embodiment, the maximum number of the storage devices 1040 which can be activated simultaneously is the number of the readers 2403. The limitation information may include information representing the number of the readers 2403 and the number of the storage devices which are set to the readers 2403. The limitation information may be stored in the memory for at least one of the server and the storage system.

Some embodiments have been explained above; however, these are examples given for the purpose of describing the present invention and it is not intended to limit the scope of the present invention to only these embodiments. The present invention can be implemented in other various forms.

For example, the device control system may specify the number of storage devices which can be activated simultaneously on the basis of the limitation information (information about a limitation on the number of storage devices which can be activated simultaneously). The device control system may determine the activation order only with respect to waiting storage devices in excess of the number of the storage devices which can be activated simultaneously from among the waiting storage devices which are issuance destinations of suppressed I/O commands. The device control system may activate as many waiting storage devices as the number of the storage devices which can be activated simultaneously, from among the waiting storage devices.

Furthermore, for example, the present invention can be applied to not only storage devices which store structured data such as a database, but also storage devices which store unstructured data like files. For example, a file system space based on a plurality of storage devices may be provided. A plurality of files may be stored in the file system space (the plurality of storage devices). A file name may be adopted instead of the DB element name. One or more I/O commands may be issued to two or more storage devices on the basis of a file I/O request from a file I/O source like a client.

The invention claimed is:

1. A computer system comprising:
    an interface unit including one or more interfaces coupled to one or more storage devices; and
    a processor unit including one or more processors coupled to the interface unit, wherein
    the processor unit is configured to:
        receive an I/O control plan representing multiple I/O commands and a priority of each of the multiple I/O commands,
        identify each storage device which is an access destination for each of the multiple I/O commands,
        determine, based on priorities of the multiple I/O commands which the I/O control plan represents and I/O amounts of the multiple I/O commands, an activation order of storage devices which are in a non-activated state and which have to be activated in order to be accessed, among the identified storage devices,
        activate the identified storage devices which are in the non-activated state in the determined activation order, and
        access the identified storage devices including the activated storage devices,
    wherein the I/O amount as for each of the storage devices which are in a non-activated state is either one of, or both of,
        an I/O number which is the number of I/O commands to the storage device, and
        an I/O size which is the size of I/O target data in accordance with one or more I/O commands for the storage device.

2. The computer system according to claim 1, wherein the processor unit is configured to determine the activation order so that an activation turn of a storage device with a larger I/O amount is earlier.

3. The computer system according to claim 1, wherein
as for a storage device to which random I/O is performed,
an activation turn in the activation order is earlier when the I/O number is greater.

4. The computer system according to claim 1, wherein
as for a storage device to which sequential I/O is performed, an activation turn in the activation order is earlier when the I/O size is greater.

5. The computer system according to claim 1, wherein
the processor unit is configured to perform I/O blocking to suppress an I/O command to a waiting storage device that is a storage device which is not yet activated, from among the storage devices which are in a non-activated state, and
one of the multiple I/O commands is the I/O command which is suppressed from being issued.

6. The computer system according to claim 5, wherein
an activation turn of the waiting storage device is based on whether or not a time calculated by subtracting elapsed time length after the performance of the I/O blocking from specified deadline time length becomes equal to a time length required to activate the waiting storage device.

7. The computer system according to claim 1, wherein
a destination of at least one I/O command other than the multiple I/O commands is one or more storage devices in an activated state; and
the processor unit is configured to issue the at least one I/O command to the one or more storage devices in the activated state without determining the activation order.

8. The computer system according to claim 1, wherein
when it is judged, based on limitation information that is information about a limitation on the number of storage devices which can be activated simultaneously, that the storage devices which are in a non-activated state cannot be activated simultaneously, the processor unit is configured to determine the activation order or activate the storage devices which are in a non-activated state in the determined activation order.

9. The computer system according to claim 1, wherein
the processor unit is configured to generate a device control plan that is information representing the storage devices which are the issuance destinations of the multiple I/O commands and one or more I/O priority levels respectively corresponding to the storage devices,
the processor unit is configured to determine the activation order as for the storage devices which are in a non-activated state and whose I/O priority levels represented by the device control plan are the same.

10. The computer system according to claim 9, wherein
the processor unit is configured to generate an I/O control plan which is information representing a relationship between the I/O target data and the I/O priority levels,
the processor unit is configured to generate the device control plan on the basis of the I/O control plan; and
as for the device control plan, the I/O priority level of a storage device which stores the I/O target data represented by the I/O control plan is in accordance with the I/O priority level corresponding to the I/O target data in the I/O control plan.

11. The computer system according to claim 9, wherein
when a storage device concerning which no I/O is likely to occur in a certain period of time in the future is identified from the device control plan, the processor unit is configured to cause the storage device to make a transition to the non-activated state.

12. The computer system according to claim 1, wherein
each of the storage devices in the non-activated state is a storage device in a low power-consumed stated; and
the activation with respect to each of the storage devices in the non-activated state is to cancel the low power-consumed state of the storage device.

13. The computer system according to claim 1, wherein
each of the storage devices in the non-activated state is a storage device which is not set to any one of storage device readers,
the number of the storage devices in the non-activated state is less than the number of the identified storage devices, and
the activation with respect to each of the storage devices in the non-activated state is to set the storage device to any one of the storage device readers.

14. In a computer system having an interface unit including one or more interfaces coupled to one or more storage devices and a processor unit including one or more processors and coupled to the interface unit, a method performed by the processing unit comprising the steps of:
receiving an I/O control plan representing multiple I/O commands and a priority of each of the multiple I/O commands,
identifying each storage device which is an access destination for each of the multiple I/O commands,
determining, based on priorities of the multiple I/O commands which the I/O control plan represents and I/O amounts of the multiple I/O commands, an activation order of storage devices which are in a non-activated state and which have to be activated in order to be accessed, among the identified storage devices,
activating the identified storage devices which are in the non-activated state in the determined activation order, and
accessing the identified storage devices including the activated storage devices,
wherein the I/O amount as for each of the storage devices which are in a non-activated state is either one of, or both of,
an I/O number which is the number of I/O commands to the storage device, and
an I/O size which is the size of I/O target data in accordance with one or more I/O commands for the storage device.

* * * * *